US008580463B2

(12) United States Patent
Natarajan et al.

(10) Patent No.: US 8,580,463 B2
(45) Date of Patent: *Nov. 12, 2013

(54) REACTANTS FOR OPTICAL DATA STORAGE MEDIA AND METHODS FOR USE

(75) Inventors: Arunkumar Natarajan, Niskayuna, NY (US); Patrick Joseph McCloskey, Watervliet, NY (US); Eugene Pauling Boden, Scotia, NY (US); Kwok Pong Chan, Troy, NY (US); Evgenia Mikhailovna Kim, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/299,021

(22) Filed: Nov. 17, 2011

(65) Prior Publication Data

US 2013/0128712 A1    May 23, 2013

(51) Int. Cl.
 G03H 1/02    (2006.01)
 C09D 11/00   (2006.01)
 C07D 209/04  (2006.01)
 C07F 5/02    (2006.01)

(52) U.S. Cl.
 USPC ............ 430/1; 430/2; 106/31.47; 106/31.78; 548/405; 548/110; 546/13

(58) Field of Classification Search
 None
 See application file for complete search history.

(56) References Cited

U.S. PATENT DOCUMENTS

| | | | | |
|---|---|---|---|---|
| 2,690,966 A | * | 10/1954 | Minsk et al. | 430/287.1 |
| 3,647,446 A | * | 3/1972 | Alsup et al. | 430/306 |
| 3,677,763 A | * | 7/1972 | De Boer et al. | 430/272.1 |
| 3,782,938 A | * | 1/1974 | De Boer | 430/287.1 |
| 3,849,144 A | * | 11/1974 | Wadsworth et al. | 430/270.1 |
| 3,919,227 A | * | 11/1975 | Andreades et al. | 526/248 |
| 4,147,552 A | * | 4/1979 | Specht et al. | 430/195 |
| 8,124,299 B2 | * | 2/2012 | Natarajan et al. | 430/1 |
| 8,182,967 B2 | * | 5/2012 | Natarajan et al. | 430/1 |
| 2008/0158627 A1 | | 7/2008 | Lawrence et al. | |
| 2011/0051586 A1 | | 3/2011 | Natarajan et al. | |

(Continued)

FOREIGN PATENT DOCUMENTS

| EP | 2290408 | * | 3/2011 |
|---|---|---|---|
| EP | 2290650 | * | 3/2011 |
| EP | 2290651 | * | 3/2011 |

OTHER PUBLICATIONS

Minsk et al, "Photosensitive polymers. I. Cinnamate esters of poly(vinyl alcohol) and cellulose", J. Appl. Poly. Sci., vol. II(6) pp. 302-307 (1959).*

(Continued)

*Primary Examiner* — Martin Angebranndt
(74) *Attorney, Agent, or Firm* — Jean Testa; Fletcher Yoder

(57) ABSTRACT

The present disclosure relates generally to optical data storage media, and more specifically, to holographic storage media. In one embodiment, an optical storage medium includes a polymer matrix having one or more polymer chains. The optical storage medium also includes a reverse saturable absorption (RSA) sensitizer disposed within the polymer matrix that is configured to become excited upon exposure to light having an intensity above an intensity threshold and configured to transfer energy to a reactant. The optical storage medium also includes a diphenyl cyclopropene (DPCP)-derivative reactant disposed within the polymer matrix and capable of undergoing a modification upon receiving an energy transfer from the excited sensitizer that changes a refractive index of the optical medium.

22 Claims, 14 Drawing Sheets

(56) References Cited

U.S. PATENT DOCUMENTS

2011/0053054 A1    3/2011   Natarajan et al.
2011/0053055 A1    3/2011   Natarajan et al.
2013/0128713 A1*   5/2013   Natarajan et al. ............ 369/103

OTHER PUBLICATIONS

Robertson et al, "Photosensitive polymers. II. Sensitization of poly-(vinyl cinnamate)", J. Appl. Poly. Sci., vol. II(6) pp. 308-311 (1959).*

DeBoer et al. "Photodimerization of cyclopropenes" JACS vol. 95(3) pp. 861-869 (1973).*

DeBoer, "Fast stable photosensitive polymers containing cyclopropene groups", J polymer. Sci., Polym Lett. Ed., vol. 11 pp. 25-27 (1973).*

Brown-Wensley et al., "Photochemical electron transfer and triplet reactions of 1,2-diphenylcyclopropene-3-carboxylate", JACS vol. 11(13) pp. 4162-4172 (1979).*

Mijovic, M., et al.; "Cross-Link Formation in a Solid Photopolymer Based on the Chromophore 1,2-Diphenylcyclopropene;" Macromolecules 1982, 15, 1464-1471, American Chemical Society.

* cited by examiner

REACTANTS FOR OPTICAL DATA STORAGE MEDIA AND METHODS FOR USE

BACKGROUND

The present disclosure relates generally to optical data storage media, and more specifically, to holographic storage media.

Optical storage media generally provide an effective platform for archiving data, offering numerous advantages over other forms of data storage in terms of cost of the medium, life expectancy of the stored data, the amount of time required to write data, and the amount of time required to access the data. Holographic storage is a specific type of optical storage in which data is written to and read from the optical medium as holograms. These holograms are images formed by the interaction of multiple beams of light in a photosensitive layer within the volume of a holographic medium. That is, for example, using a combination of a reference light beam and a signal light beam, a three-dimensional interference pattern may be formed in the holographic medium as certain species present are chemically modified by the beams, modulating the refractive index of specific portions of the holographic medium.

In such a holographic medium, a reverse saturable absorber (RSA) may be used as an energy-transfer threshold dye. In general, an energy-transfer threshold dye may be generally responsible for absorbing recording light (e.g., from the reference beam and signal beam) and causing a chemical reaction to occur. That is, when the recording light is beyond a particular intensity threshold, the RSA dye may be absorb multiple photons of recording light and then transfer the energy of the excited state to a reactant species. In response, the reactant species may undergo a chemical reaction (e.g., dimerization reactions, isomerization reactions, or inter- or intra-molecular condensation reactions), which may cause a localized change in the refractive index of the holographic medium, essentially capturing the intensity and phase of the recording light. Subsequently, upon interrogating the holograms using a lower intensity of light, this captured information may be recovered in a nondestructive fashion such that the associated encoded data may be deciphered. However, the reactant should have sufficient sensitivity to enable efficient recording of data to the holographic medium.

BRIEF DESCRIPTION

In one embodiment, an optical storage medium includes a polymer matrix having one or more polymer chains. The optical storage medium also includes a reverse saturable absorption (RSA) sensitizer disposed within the polymer matrix that is configured to become excited upon exposure to light having an intensity above an intensity threshold and configured to transfer energy to a reactant. The optical storage medium also includes a diphenyl cyclopropene (DPCP)-derivative reactant disposed within the polymer matrix and capable of undergoing a modification upon receiving an energy transfer from the excited sensitizer that changes a refractive index of the optical medium.

In another embodiments, a refractive-index change composition includes a reverse saturable absorption (RSA) sensitizer and a diphenyl cyclopropene (DPCP)-derivative reactant species having the general formula:

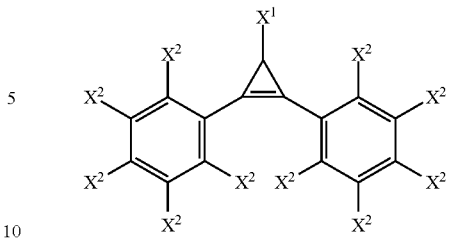

wherein,
$X^1$ comprises a proton, a carbonyl, a carboxylic acid, a carboxylate, or an ether, ester, or amide linkage to a polymer chain; and wherein each $X^2$ independently comprises a proton, a halide, a hydrocarbyl group having between 1 and 10 carbons, an alkoxy group having between 1 and 10 carbons, a nitro group, an amine group, or portions of a larger arene structure having between 1 and 20 carbons.

A method for storing data on an optical medium including irradiating a portion of the optical medium with recording light having an intensity above an intensity threshold, wherein the optical medium comprises a reverse saturable absorber (RSA) and a diphenyl cyclopropene (DPCP)-derivative reactant disposed within a polymer matrix. The method further includes exciting the RSA to an excited triplet state with the recording light such that the excited RSA sensitizes a chemical modification of the reactant. The method further includes modifying the DPCP-derivative reactant such that the refractive index of the portion of the optical medium is altered to form a hologram in the optical medium.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

It should be generally noted that, as used herein, "fluence" is a measure of the amount of optical beam energy that has traversed a unit area if the beam cross-section (e.g., in units of Joules/cm$^2$), while "intensity", also known as optical radiative flux density, is a measure of the energy that has traversed a unit area of the beam cross-section per unit time (e.g., in units of Watts/cm$^2$). Furthermore, the term "quantum efficiency", as used herein, is the probability an absorbed photon will result in a chemical transformation that modulates the refractive index of an optical medium. Additionally, the "sensitivity" of a particular holographic medium generally refers to the quantum efficiency of a holographic medium (e.g., when recording light of relatively low intensity is used).

The disclosed embodiments include an optical medium suitable for holographic data storage as well as methods for using such a platform for data storage. Generally speaking, the holographic medium may include a nonlinear sensitizer species (e.g., an RSA dye) and a reactant species disposed together in a polymer matrix. In particular, the reactant species may be a diphenyl cyclopropene (DPCP)-derivative capable of undergoing a chemical transformation that results in a change in the index of refraction of the holographic medium. During operation, the RSA dye may absorb recording light (i.e., actinic radiation) and, subsequently, cause the DPCP-derivative units to undergo a chemical reaction (i.e., [2+2] indirect photodimerization) that records information about the recording light as a hologram in the optical medium. As described in detail below, these DPCP-derivatives provide the aforementioned index-change behavior and afford relatively high quantum efficiencies. By incorporating these DPCP-derivatives, an optical medium may be produced that affords greater sensitivity and efficiency during the writing process than materials previously used.

Figure 1:
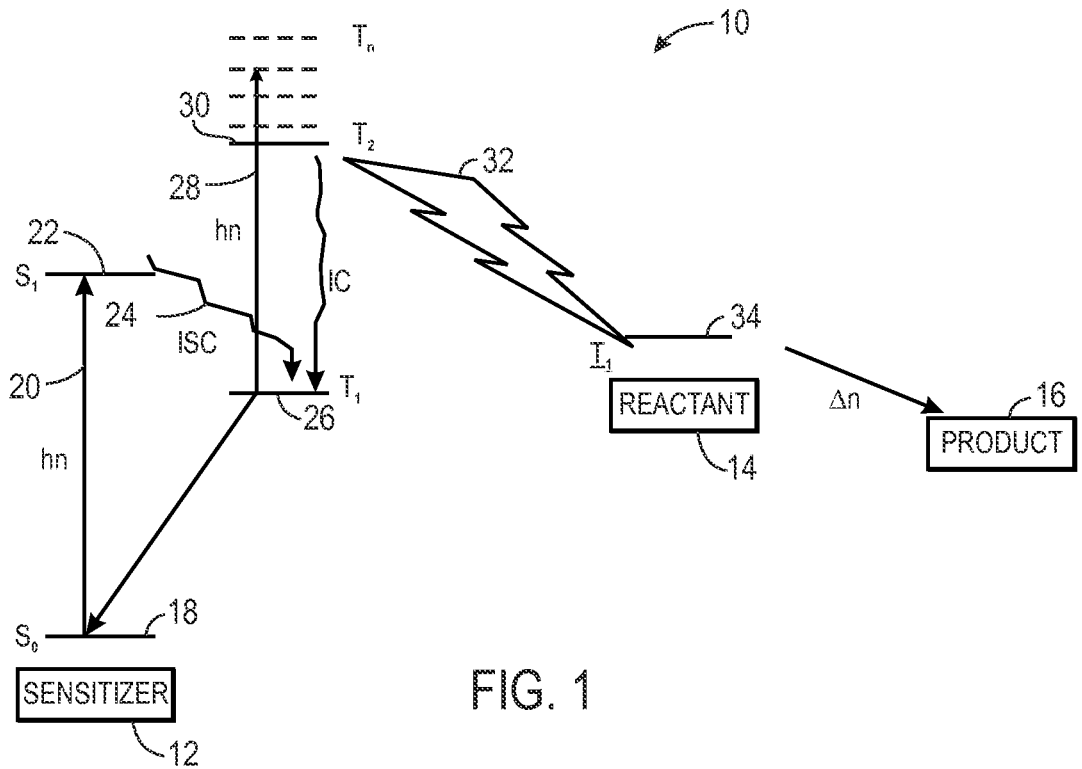
FIG. 1 is an energy level diagram illustrating excitation of the sensitizer and energy transfer to the reactant, in accordance with aspects of the present disclosure.

As mentioned, the disclosed optical medium embodiments utilizing the DPCP-derivative reactant species exhibit a non-linear response to the recording light (i.e., actinic radiation). FIG. 1 depicts an energy diagram 10 that illustrates the interactions of various energy levels present within an optical medium. More specifically, FIG. 1 illustrates some possible interactions between certain energy levels of a sensitizer 12 (e.g., an RSA dye), the reactant species 14 (e.g., a DPCP-derivative), and the resulting product 16. In general, the sensitizer 12 in its ground state, $S_0$ 18, does not substantially absorb photons of the recording light. However, if the intensity of the recording light is beyond a particular threshold, then the sensitizer 12 may become excited (e.g., via a first photon absorption 20) to reach an excited singlet state (e.g., $S_1$ 22). At some point after initial absorption 20, the sensitizer 12 may undergo intersystem crossing (ISC) 24 to arrive at an excited triplet state (e.g., $T_1$ 26). This triplet state 26 may generally have a higher absorption cross-section than the singlet ground state $S_0$ 18 and, accordingly, be a substantially stronger absorber of the recording light (i.e., a non-linear response to the actinic radiation). As such, the sensitizer 12 may absorb 28 another photon of the recording light to reach an excited triplet state RSA$^{3*}$ (e.g., $T_2$ 30). Accordingly, after absorbing two photons of the recording light, the sensitizer 12 may then transfer 32 the energy of the excited triplet state (e.g., $T_2$ 30) to a triplet energy level (e.g., $T_1$ 34) of the reactant species 14 present in the holographic medium. The reactant 14, having received this energy transfer, may subsequently chemically react (e.g., dimerize with another reactant unit present) to afford the product 16 as well as the aforementioned change in the refractive index of the holographic medium, producing the hologram. After sensitizing the triplet state $T_1$ 34 of the reactant species 14, the sensitizer 12 may return to the ground state $S_0$ 18 to continue the process. While one energy pathway is presented in FIG. 1, it should be appreciated that a number of other energy pathways (e.g., including other absorption, decays, and conversions) within the system are possible.

Figure 2:
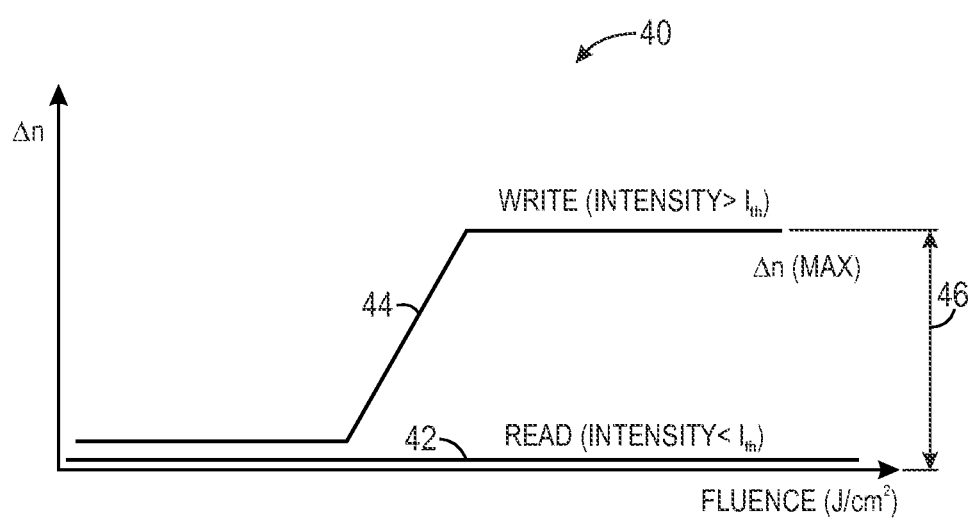
FIG. 2 is a graph illustrating the non-linear absorption of a threshold sensitizer, in accordance with aspects of the present disclosure.

Accordingly, only regions of the optical medium that receive sufficient recording light (e.g., beyond the intensity threshold) may experience a localized change in refractive index. To better illustrate this effect, FIG. 2 demonstrates the threshold response of an optical medium to light of varying fluence. More specifically, FIG. 2 illustrates a plot 40 of the change in the index of refraction (e.g., $\Delta n$) of a threshold material (e.g., an optical medium including an RSA dye and a DPCP-derivative reactant species) over a range of light fluences. The illustrated plot 40 includes two curves: one curve 42 representing a read operation, and another curve 44 representing a write operation with the holographic medium. In curve 42, the intensity of the incident light is below the threshold (e.g., $I_{th}$) of the RSA material and, accordingly, regardless of the fluence of the light incident on the material, there is no substantial change in the refractive index of the optical medium. In contrast, curve 44 illustrates that when the RSA material is irradiated with light having an intensity above the threshold (e.g., $I_{th}$) of the RSA material (as well as sufficient fluence) a substantial modulation 46 of the refractive index of the threshold material may be observed. Accordingly, an optical medium utilizing such an RSA dye and reactant species may exhibit this non-linear response to recording light. That is, the optical medium may not demonstrate any substantial change in refractive index when the actinic light is below a certain intensity threshold, but demonstrate a significant change of the refractive index when the actinic light is above a certain intensity threshold (e.g., demonstrated in curve 44). Furthermore, the hologram written by this change in the refractive index may be interrogated using light below this intensity threshold (e.g., $I_{th}$) such that the holographic medium may not be substantially altered during the reading process (e.g., demonstrated in curve 42).

Figure 3:
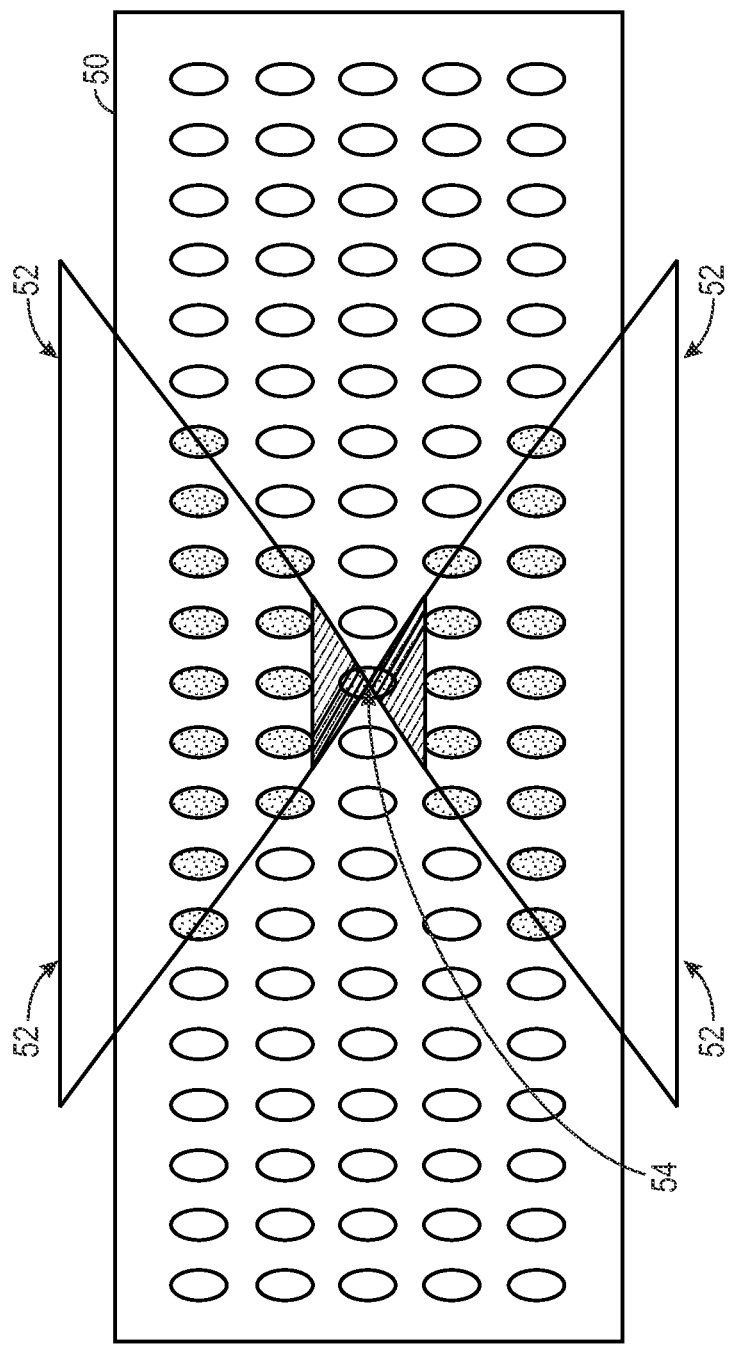
FIG. 3 is a cross-sectional view of an optical storage medium being irradiated with recording light, in accordance with aspects of the present disclosure.

To further illustrate how data may be written to the holographic medium, FIG. 3 depicts a cross-sectional view a holographic medium 50 being exposed to recording light. More specifically, FIG. 3 illustrates a holographic medium 50 that includes an RSA dye and a DPCP-derivative reactant species disposed together in a polymer matrix. Additionally, FIG. 3 illustrates the volume 52 of the holographic medium 50 through which the recording light (e.g., the actinic radiation, including a reference and signal beam) passes. Since the holographic medium 50 utilizes an RSA dye, the entire volume 52 of the holographic medium 50 does not receive sufficient recording light (e.g., above the intensity threshold of the RSA dye) to affect the modulation of the refractive index. Rather, only the focal point 54 (e.g., the intersection of the reference and signal beams), receives recording light above the intensity threshold of the RSA dye and, accordingly, experiences a change in the refractive index, resulting in the writing of a hologram into the holographic medium. Accordingly, by using the combination of the RSA dye and reactant species undesirable chemical modifications in portions of the medium located near a hologram that is being written are obviated.

An optical medium may, in general, include an RSA dye and a reactant species (e.g., a DPCP-derivative) disposed together within a polymer matrix. In general, the polymer matrix of the holographic medium may be any polymer (e.g., a plurality of polymer chains) commonly used in the production of optical media. For example, the polymer may include polyalkyl (methacrylates) (PMMAs), polyvinyl alcohols, poly(alkyl acrylates), polystyrenes, polycarbonates, poly acrylates, poly(vinylidene chloride), and poly(vinyl acetate). Additionally, in certain embodiments, the reactant species may be covalently bound the polymer backbone (e.g., via an ester linkage to polyvinyl alcohol), as discussed in detail below. In certain embodiments the reactant species units may be non-covalently associated with the polymer backbone (e.g. via. ionic interaction, hydrogen bonding, etc.). Also, the support for the optical medium may be provided by a number of commonly employed polymer materials, including polymethyl (methacrylate) PMMA, polycarbonates, poly(ethylene terephthalate), poly(ethylene naphthalene), polystyrene, or cellulose acetate. Additionally, the holographic medium may also include mediators, photostabilizers, plasticizers commonly known in the art.

In the production of an optical medium, it is generally desirable to employ RSA dyes having relatively high quantum efficiencies. For example, U.S. patent application Ser. No. 12/551,410, entitled, "COMPOSITIONS, OPTICAL DATA STORAGE MEDIA AND METHODS FOR USING THE OPTICAL DATA STORAGE MEDIA", which is incorporated by reference herein in its entirety for all purposes, discloses the use of platinum ethynyl complexes as RSA dyes for optical storage media. By further example, U.S. patent application Ser. No. 12/967,291, entitled, "OPTICAL DATA STORAGE MEDIA AND METHODS FOR USING THE SAME", which is incorporated by reference herein in its entirety for all purposes, discloses the use of ethyl violet non-linear sensitizers as RSA dyes for optical storage media. Furthermore, U.S. patent application Ser. No. 12/551,455, entitled, "COMPOSITIONS, OPTICAL DATA STORAGE MEDIA AND METHODS FOR USING THE OPTICAL DATA STORAGE MEDIA", which is incorporated by reference herein in its entirety for all purposes, discloses the use of a number of different non-linear sensitizers, including subphthalocyanine (sub-PC), as RSA dyes for optical storage media. The sub-PC structure affords good RSA behavior using recording light at about 405 nm. Furthermore, in certain embodiments, the RSA dye may be a metal-substituted subphthalocyanine (M-sub-PC) derivative such as those disclosed in the co-pending U.S. patent application Ser. No. 13/299,029, filed concurrently herewith, entitled "REVERSE SATURABLE ABSORBTION SENSITIZERS FOR OPTICAL DATA STORAGE MEDIA AND METHODS FOR USE", which is incorporated by reference herein in its entirety for all purposes. Generally speaking, the M-sub-PC RSA dyes provide an enhanced quantum efficiencies when using low recording light fluences compared to the sub-PC structure alone. It should be noted that any number sensitizers that provide the requisite RSA behavior around the wavelength of the recording light (e.g., around 405 nm) may be utilized with the DPCP-derivative reactant species in the production of an optical medium. Furthermore, the RSA dye may be used in amounts of from about 0.002 weight % to about 5 weight % based upon the total weight of the composition (i.e., the optical medium). In certain embodiments, the RSA dye may be present at a concentration between approximately 0.01 M and 0.1 M, with respect to the other components of the optical medium.

In particular, U.S. patent application Ser. No. 12/551,455, entitled, "COMPOSITIONS, OPTICAL DATA STORAGE MEDIA AND METHODS FOR USING THE OPTICAL DATA STORAGE MEDIA", which is incorporated by reference herein in its entirety for all purposes, discloses the use of a particular non-linear sensitizer, namely subphthalocyanine (sub-PC), as an RSA dye for optical storage media. The sub-PC structure affords good RSA behavior using recording light at about 405 nm (±10 nm). An example of a sub-PC is shown below:

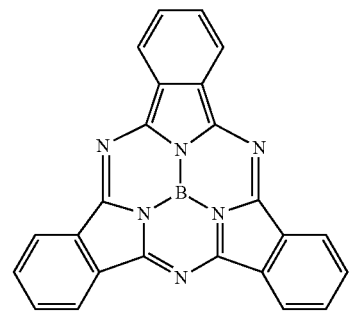

Present embodiments are directed toward the modification of the sub-PC structure to include one or more functional groups bearing at least one metal atom. As such, it should be noted that, while a particular sub-PC structure is included above, this presently disclosed modification is contemplated for any sub-PC structure. That is, any subphthalocyanine RSA that substantially responds to radiation at a wavelength less than approximately 500 nm (e.g., around 405 nm) may be modified according to the presently disclosed methods for use in optical data storage media.

The present disclosure addresses modifications to the sub-PC structure generally relating to the addition of functionality capable of binding a metal atom to a sub-PC core structure. That is, the present embodiments include metal-subphthalocyanine (M-sub-PC) derivatives, which incorporate metal-containing functional groups or moieties into the sub-PC structure. For example, a general structure of a M-sub-PC is shown below:

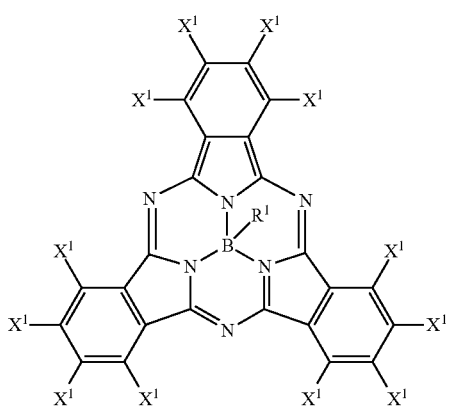

where $R^1$ may generally be any functional group capable of binding or chelating one or more metal atoms; and each $X^1$ may independently be either a proton, a halide (e.g., bromide, fluoride, chloride, iodide, etc.), a hydrocarbyl group (e.g., methyl, ethyl, t-butyl, etc.), or an alkoxy (e.g., methoxy, ethoxy, etc.) group. Examples of suitable subphthalocyanines (sub-PC) core structures include, but are not limited to: 2,9,16-tribromosubphthalocyanato boron(III); 2,9,16-triiodosubphthalocyanato boron(III); trinitrosubphthalocyanato boron(III); 2,9,16-tri-tertbutylsubphthalocyanato boron(III); 2,9,17-tri-tert-butylsubphthalocyanato boron(III); and 2,9,16-triiodosubphthalocyaninato boron(III). Any of these, as well as any other subphthalocyanine core structures affording RSA behavior at a wavelength of about 405 nm, may be utilized. Furthermore, it should be noted that, while in the structure included above, $R^1$ is illustrated as being bound to the boron atom, in other embodiments a metal-bearing functionality $R^1$ may be bound to any other atom of the sub-PC structure (e.g., a carbon or nitrogen atom anywhere in the structure). Furthermore, it should be noted that, in certain M-sub-PC embodiments, multiple metal-bearing groups (e.g., $R^1$, $R^2$, etc.) may be used to derivatize the sub-PC structure. For example, in certain embodiments, the M-sub-PC structure may (in addition or in alternative to having a metal-beardding group, $R^1$, bound to the boron atom) have other metal-bearing group bound to a different atom in the structure (i.e., $X^1$ may also include $R^1$ or $R^2$).

Generally speaking, $R^1$ is a functional group or a collection of functional groups that couple a metal center to the sub-PC core structure. Accordingly, $R^1$ may be described by the general formula:

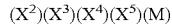

$(X^2)(X^3)(X^4)(X^5)(M)$ where each of $X^2$, $X^3$, $X^4$, $X^5$, and M represent a portion of the structure $R^1$ comprising one or more atoms, as discussed in detail below. As presented in detail below, $X^2$ is a point of attachment for $R^1$ to the sub-PC core structure; $X^3$ is a linker portion of $R^1$; $X^4$ is the metal binding portion of $R^1$; and M is the attached metal center along with a number of associated ligands or counter-ions, $X^5$. It should be appreciated that a single connection or bond may exist between the various portions of $R^1$ (e.g., $X^2$, $X^3$, $X^4$, $X^5$, and M), or in certain embodiments, two or more bonds may couple these portions together (e.g., through multiple points of attachment or multiple bonds to the same point of attachment). It should be further appreciated that bonds, as presently used, refers to any chemical bond or attractive force between two atoms, including covalent bonding (e.g., normal covalent bonding and coordinate covalent bonding) and non-covalent bonding (e.g., ionic interactions, hydrogen bonding, columbic attraction, or similar interaction). Furthermore, while various combinations of points of attachment $(X^2)$, linkers, $(X^3)$, metal binding portions, $(X^4)$, metals (M), and ligands/counter-ions $(X^5)$ are included in example structures below, it should be appreciated that many other combinations of $X^2$, $X^3$, $X^4$, $X^5$, and M are also possible and may also be used.

Accordingly, $R^1$ includes a point of attachment, $X^2$, for coupling to the sub-PC core structure. In certain embodiments, $X^2$ may be an oxygen atom (e.g., as part of a phenoxy or alkoxy unit). In other embodiments, $X^2$ may be a carbon, nitrogen, sulfur, phosphorus, or similar atom capable of forming a bond with the boron atom of the sub-PC core structure. Additionally, in other embodiments, $X^2$ may include a plurality of atoms (e.g., a functional group) that binds $R^1$ to the remainder of the M-sub-PC molecule. For example, in certain embodiments, $X^2$ may comprise a portion of an ester or amide linkage to the sub-PC portion of the M-sub-PC structure.

Additionally, in certain embodiments, $R^1$ may also include a linker, $X^3$, which may couple the point of attachment $(X^2)$ to the metal binding portion $(X^4)$. In general, $X^3$ may be any atom or series of atoms (e.g., carbon, nitrogen, oxygen, and/or protons) capable of coupling $X^2$ to $X^4$. It should be appreciated that the structure of $X^3$ may be selected to provide particular properties. That is, in certain embodiments, $X^3$ may be an alkyl chain (e.g., 1 to 10 carbons in length) selected to provide a non-conjugated, flexible connection to the metal binding portion $(X^4)$. In other embodiments, $X^3$ may be a conjugated structure (e.g., an arene ring, a polyaromatic structure, a conjugated chain, or similar structure) selected to provide a conjugated and/or less-flexible connection to the metal binding portion $(X^4)$. In other embodiments, R may not include a linker $X^3$ and, as such, the point of attachment $(X^2)$ may be directly attached to the metal-binding portion of the structure $(X^4)$. In still other embodiments, linkers $(X^3)$ having both saturated and unsaturated portions may be used in particular combinations to provide desired characteristics in terms of the position of the metal center relative to the sub-PC core structure, the electronic properties of the molecule between the metal center and the core structure, and the desired flexibility of the linker unit.

The metal atom(s) (M) incorporated into the metal binding portion $(X^4)$ in the M-sub-PC structure may be any metal (e.g., indium, lead, zinc, rubidium, tin, cesium, or similar metal) or metalloid (e.g., thallium, antimony, or similar metalloid). Furthermore, in addition to the bonds to the metal bearing portion $(X^4)$, M may include any number of ligands and/or counter-ions, $X^5$ (e.g., to coordinatively saturate the metal center). For example, in some embodiments, $X^5$ may comprise acetyl acetone (ACAC) ligands, nitrate ligands, hydrocarbyl ligands (e.g., methyl, ethyl, propyl, butyl), pyridine-based ligands, halide counter-ions (e.g., chlorine, bromine, iodine, fluorine, etc.), or any other ligands or counter-ions commonly known in the art. For example, in certain embodiments, the metal (Al) may be a sodium, potassium, or rubidium atom used with an iodide counter ion $(X^5)$. By further example, in certain embodiments, the metal (M) may be a thallium, lead, rubidium, or cesium atom with an iodide or nitrate counter-ion $(X^5)$. By further example, in certain embodiments (M) may be an indium, lead, or zinc atom with two ACAC ligands or three butyl ligands $(X^5)$. Furthermore, in certain embodiments, metal clusters comprising a plurality of metal atoms (and possibly a number of oxygen atoms) are also contemplated for use with the present techniques.

Furthermore, $R^1$ includes a metal binding portion $(X^4)$ which enables $R^1$ to at least partially bind or chelate a metal atom (M). That is, $X^4$ may incorporate any functional group or moiety, or any collection of functional groups or moieties, commonly known in the art to be used for the attachment or chelating of metal atoms. Accordingly, generally speaking, $X^4$ may comprise a number of atoms (e.g., carbon, nitrogen, oxygen, boron, phosphorus, or sulfur) having one or more orbitals capable of interacting with the orbitals of the metal atom (M) such that the metal may be secured to the remainder of $R^1$. For example, as discussed in detail below, certain embodiments of $X^4$ may include, but are not limited to, crown-ether derivatives, diketone derivatives, pyridine derivatives, porphyrin derivatives, calixarene derivatives, cyclodextrin derivatives, or similar metal-binding structures.

Figure 11:
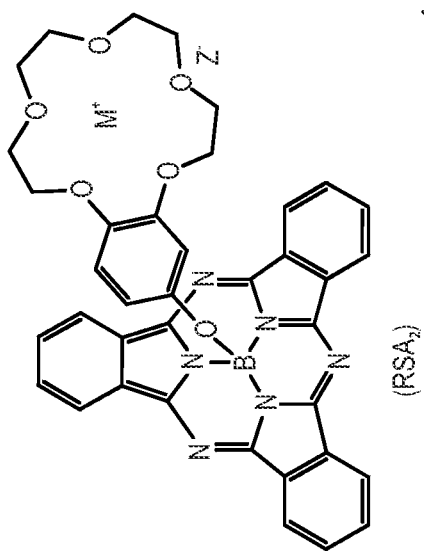
FIG. 11 illustrates examples of crown-ether-based M-sub-PC RSA dyes, in accordance with aspects of the present disclosure.
Figure 11:
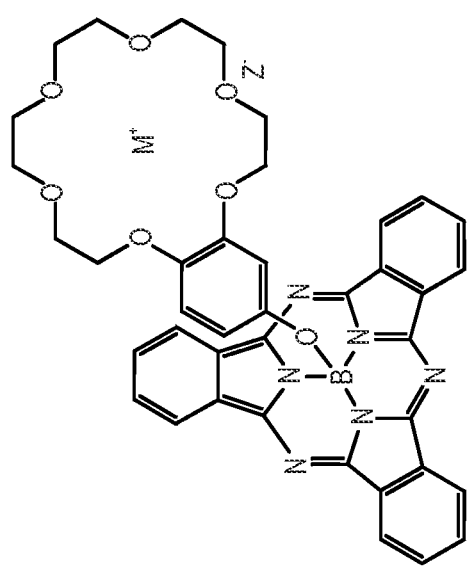

In certain embodiments, $R^1$ may be a crown-ether derivative according to the general structure included below:

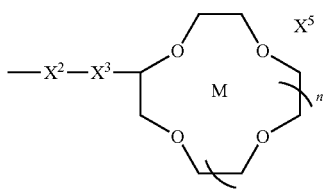

where n may be any integer from 1 to 10. By further example, $R^1$ may include, but is not limited to, the $R^1$ groups depicted for the example crown-ether derivative structures illustrated in FIG. 11. That is, FIG. 11 includes two crown-ether derivatives, namely: a 15-crown-5 derivative ($RSA_1$) and an 18-crown-6 derivative ($RSA_2$). It should be appreciated that while these two crown-ether derivatives are included above, any number of different sizes and types of hetero macrocycles may be used. For example, the crown-ether derivative portion of the M-sub-PC RSA dye (i.e., the metal binding portion $X^4$ of $R^1$) may be a 12-crown-4 ether derivative, a 21-crown-7 ether derivative, a 24-crown-8 ether derivative, or any other crown ether derivative. Examples demonstrating the synthesis of crown-ether derivatives are provided below.

Figure 12:
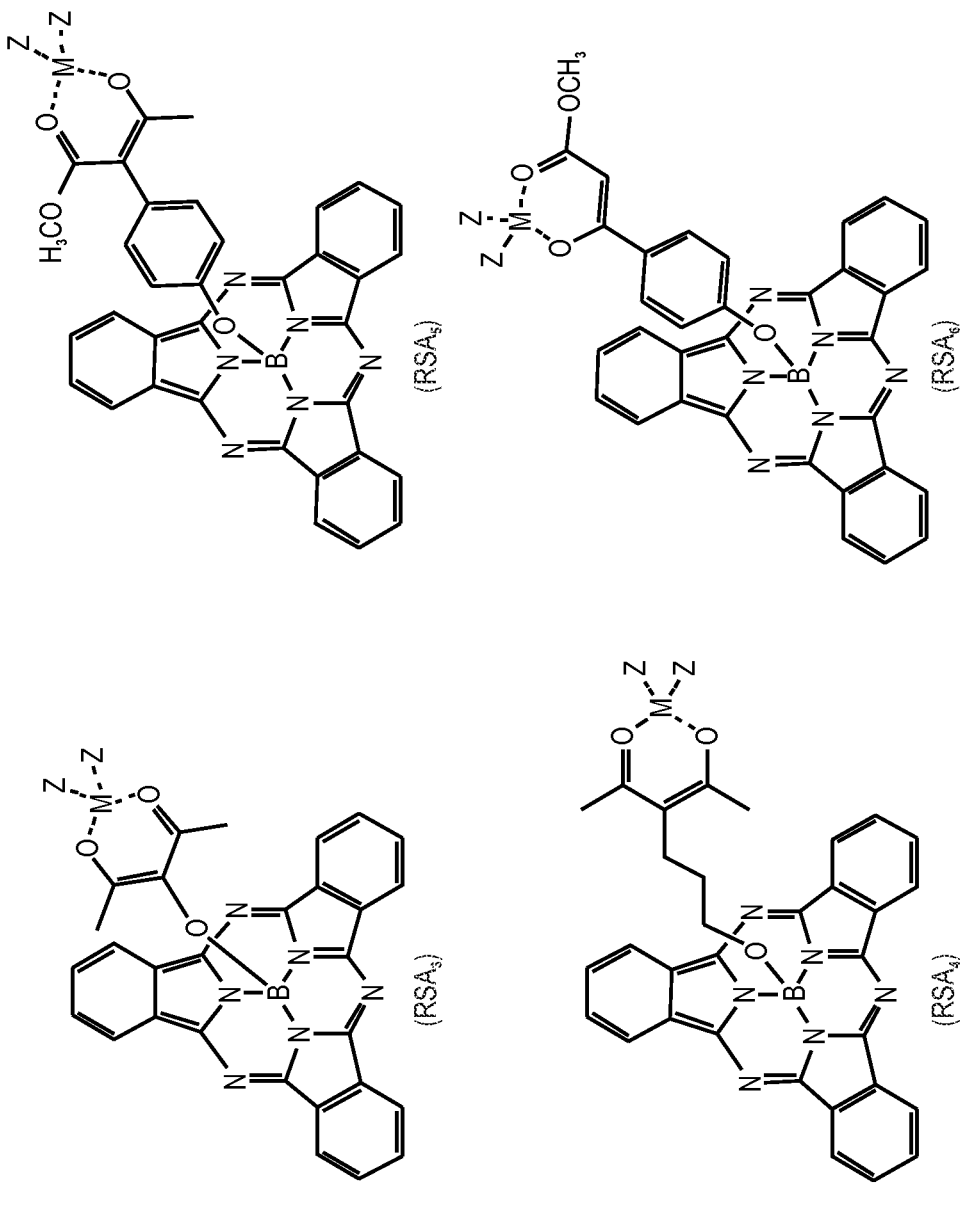
FIG. 12 illustrates examples of diketone-based M-sub-PC RSA dyes, in accordance with aspects of the present disclosure.

In certain embodiments, $R^1$ may also be a diketone (e.g., acetyl acetone (ACAC)) derivative as indicated by the general structures included below:

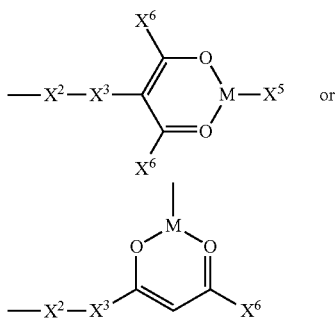

where each $X^6$ may independently be either a proton, a hydrocarbyl group having between 1 and 10 carbons, a hydroxyl group, an amino group, an alkyl amino group (e.g., dimethyl amine), an alkoxy group (e.g., methoxy, ethoxy, etc.), a halide (e.g., chlorine, bromine, iodine, fluorine, etc.), or similar species. By further example, $R^1$ may include, but is not limited to, the $R^1$ groups depicted for the example diketone M-sub-PC structures illustrated in FIG. 12. In particular, FIG. 12 illustrates diketone-based M-sub-PCs $RSA_3$ and $RSA_4$, which are similar ACAC-based M-sub-PCs, with M-sub-PC $RSA_4$ differing from M-sub-PC $RSA_3$ by three carbon alkyl linker portion ($X^3$). FIG. 12 also illustrates M-sub-PC $RSA_5$ and $RSA_6$, which are both methoxy-ACAC derivatives where $X^3$ is a phenylene unit. However, M-sub-PC $RSA_5$ illustrates the ACAC metal binding portion ($X^4$) as being coupled to the linker via the center carbon (i.e., between the carbonyl groups), while M-sub-PC $RSA_6$ illustrates the ACAC portion as being coupled to the linker via one of the carbonyl carbons. It should be appreciated that the diketones may be exist and/or be illustrated as either being the diketone or the enol tautomer.

Figure 13:
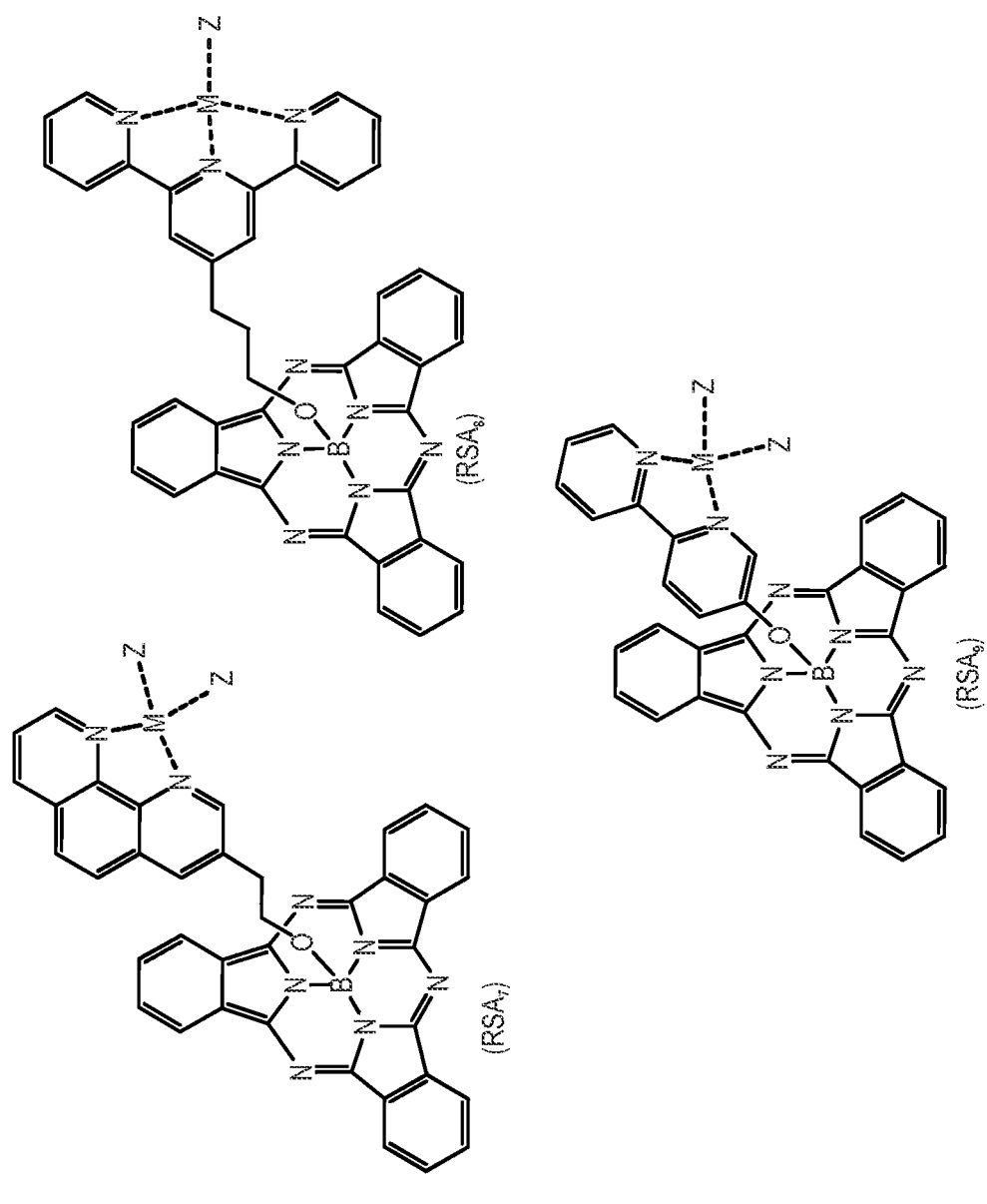
FIG. 13 illustrates examples of pyridine-based M-sub-PC RSA dyes, in accordance with aspects of the present disclosure.

In certain embodiments, $R^1$ may also be a pyridine derivative as indicated by the general structures shown below:

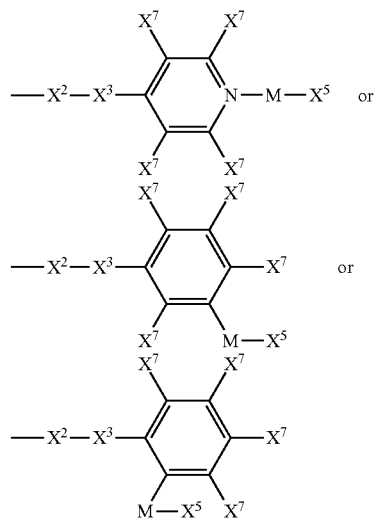

where each $X^7$ may independently be either a proton, a carboxylic acid group, an alkyl ester (e.g., a methyl ester) group, an amino group, an alkyl amino group (e.g., dimethyl amine), an alkoxy group (e.g., methoxy, ethoxy, etc.), a halide (e.g., chlorine, bromine, iodine, fluorine, etc.), a hydrocarbyl group having between 1 and 10 carbons, portions of another heteroarene (e.g., pyridine ring) or other arene structure, or similar species. By further example, $R^1$ may include, but is not limited to, the $R^1$ groups depicted for the example M-sub-PC structures illustrated in FIG. 13. In particular, FIG. 13 depicts a phenantherene-based M-sub-PC ($RSA_7$), terpyridine-based M-sub-PC ($RSA_8$), and bis-pyridine-based M-sub-PC ($RSA_9$). In the illustrated embodiments, bis-pyridine-based M-sub-PC $RSA_9$ lacks a linker ($X^3$) while the phenantherene-based M-sub-PC $RSA_7$ has a two carbon alkyl linker, and the terpyridine-based M-sub-PC $RSA_8$ has the longest, three carbon alkyl linker. Additionally, it should be appreciated that while these three structures (e.g., $RSA_7$, $RSA_8$, and $RSA_9$) illustrate specific examples of pyridine derivative-based RSA dyes, other pyridine derivative-based RSA dyes may be utilized.

EXAMPLE 1

Synthesis of metallated subphthalocyanines (M-sub-PCs)

Benzo-15C5, Benzo-18C6, polyphosphoric acid, acetic anhydride, Metal salts and subphthalocyanine-chloride (all purchased from Aldrich) were used as received. $^1$H NMR spectra were obtained on a Bruker 400 MHz spectrophotometer. UV-Vis absorption spectra were obtained on Cary UV spectrophotometer.

Figure 14:
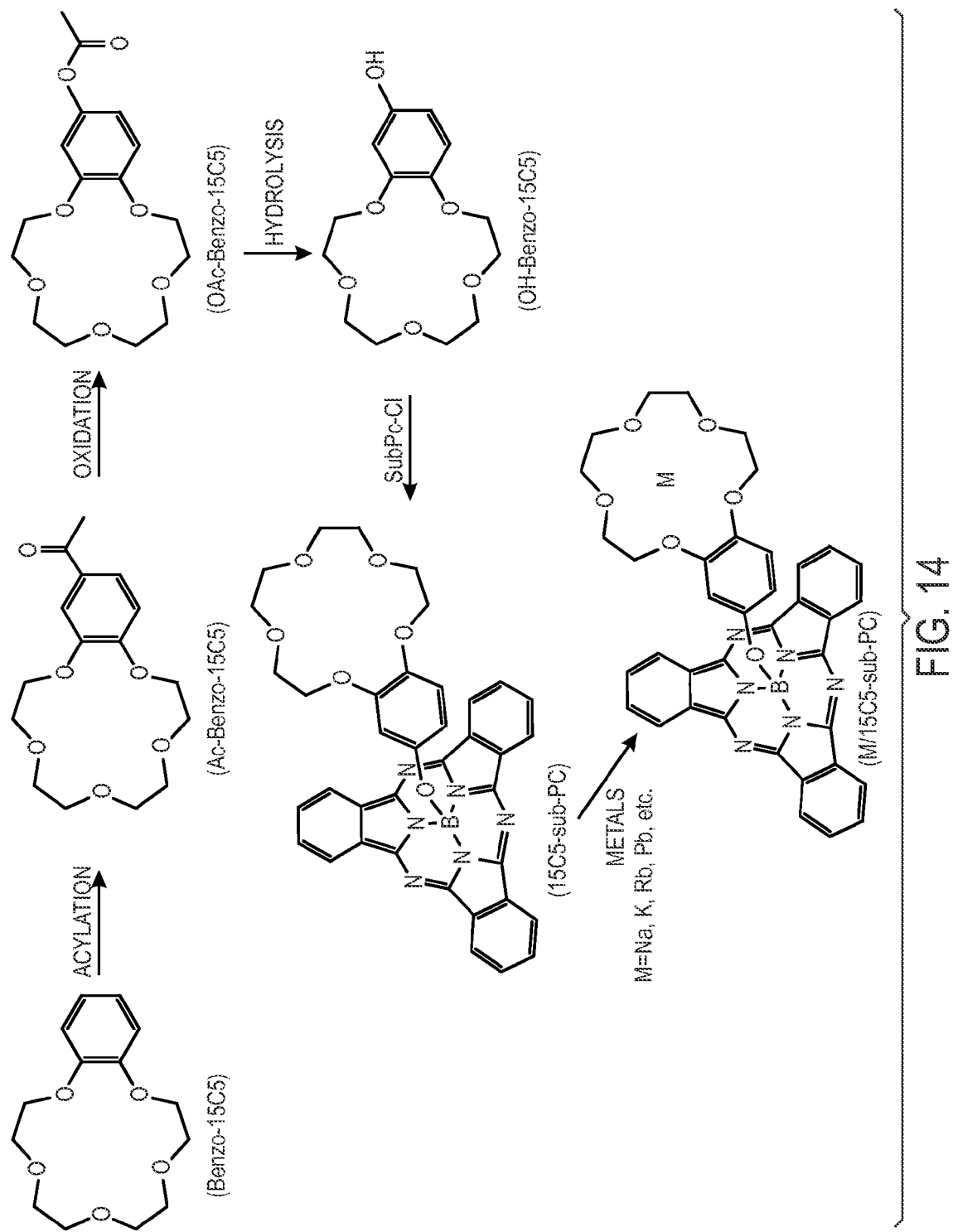
FIG. 14 is a schematic of a synthetic route for producing metal-substituted 15-crown-5ether-based RSA dyes, in accordance with aspects of the present disclosure.
Figure 15:
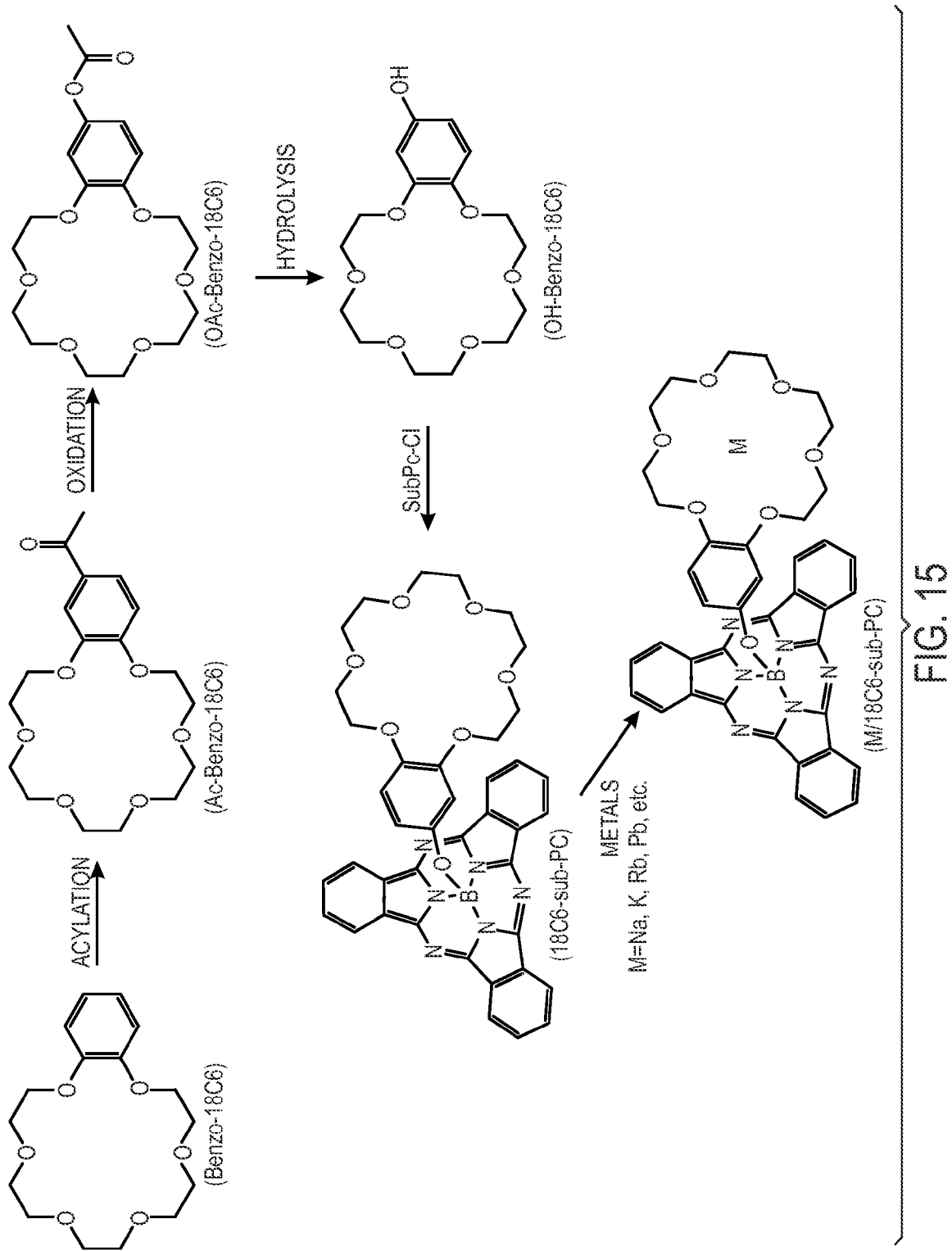
FIG. 15 is a schematic of a synthetic route for producing metal-substituted 18-crown-6ether-based RSA dyes, in accordance with aspects of the present disclosure.

The synthesis routes, shown in FIGS. 14 and 15, are provided as examples of synthesizing M-sub-PC crown-ether derivatives (e.g., $RSA_1$ and $RSA_2$) having an absorption minimum (i.e., RSA behavior) at 405 nm. The 15C5 and 18C6 crown ether M-sub-PC derivatives were prepared. Generally speaking, the synthesis scheme follows a series of steps starting from Benzo-15C5(or Benzo-18C6 for FIG. 15) through acylation, oxidation, hydrolysis, condensation and metal incorporation, respectively, to obtain the M-sub-PC structure.

Synthesis of metallated 15-crown-5 ether subphthalocyanine (M/15C5-sub-PC) derivatives.

For the acylation reaction, a three neck flask was charged with polyphosphoric acid/acetic acid (3 g/7 g), Benzo-15C5 (4.5 g, 16.77 mmol), acetic anhydride (7.5 g, 3.5 equs, 58.7 mmol). The reaction mixture was stoppered, kept under nitrogen atmosphere, heated at 45° C., and left to stir overnight. The dark brown reaction mixture was washed twice with water (100 mL). The organic products were taken into methylene chloride (100 mL) and dried over $MgSO_4$. The product was chromatographed on $SiO_2$ with EtOAC: Hexane=40:60 ratio eluent. The product, Ac-Benzo-15C5, was isolated as pale white solid (4.5g). $^1$H NMR ($CDCl_3$) δ: 7.59 (d, 1H), 7.56 (s, 1H), 6.9 (d, 1H), 4.22 (m, 4H), 3.9-4.0 (m, 4H), 3.8 (s, 8H), 2.59 (s, 3H).

For the oxidation step, a single neck round bottom flask was charged with Ac-Benzo-15C5 (4.5 g, 14.5 mmol), 20 mL $CH_2Cl_2$ and metachloroperbenzoic acid (mCPBA) 1.3 equs (3.25 g, 18.87 mmol). The reaction mixture was stoppered, kept under nitrogen atmosphere, and left to stir overnight. The yellow precipitate reaction mixture was washed with saturated $NaHCO_3$ and then twice with water (100 mL). The organic products were taken into methylene chloride (100 mL) and dried over $MgSO_4$. The product, OAc-Benzo-15C5, was isolated as yellow solid (4.51 g) and used without any further purification. $^1$H NMR ($CDCl_3$) δ: 6.9 (d, 1H), 7.63 (s, 1H), 6.62 (d, 1H), 4.16 (m, 4H), 3.9 (m, 4H), 3.8 (s, 8H), 2.3 (s, 3H).

For the hydrolysis step, a single neck round bottom flask was charged with OAc-Benzo-15C5 (3.0 g, 13.8 mmol), and hydrolyzed under refluxing conditions with aqu. NaOH (10% solution) and the reaction mixture were stirred for 3 hours under nitrogen blanket. The reaction mixture was washed with saturated $NaHCO_3$ and then with water twice (50 mL). The organic products were taken into methylene chloride (50 mL) and dried over $MgSO_4$. The product, OH-Benzo-15C5, (0.6 g) was obtained was used without any further purification. $^1$H NMR ($CDCl_3$) δ: 6.75 (d, 1H), 6.44 (s, 1H), 6.35 (d, 1H), 4.1 (m, 4H), 3.9 (m, 4H), 3.78 (s, 8H).

For the condensation step, a single neck round bottom flask was charged with subphthalocyanine chloride (0.7 g) and OH-Benzo-15C5 (0.55 g, 1.95 mmol) and 10 mL toluene. The flask was fitted to a water cooled condenser and the reaction mixture was placed in a hot oil bath and refluxed for 3 days under a nitrogen blanket. The reaction mixture was cooled and diluted with 20 mL chloroform, washed with 10% NaOH solution, followed by a water wash. Later, the reaction mixture was suction filtered to remove an unreacted subphthalocyanine chloride, followed by drying the solution with $MgSO_4$. The filtrate solution was removed on a rotary evaporator and dried to isolate the pink product, 15C5-sub-PC, (0.25 g). $^1$H NMR ($CDCl_3$) δ: 8.94 (m, 6H), 7.98 (m, 6H), 6.3 (d, 1H), 5.0 (s, 1H), 4.9 (d, 1H), 4.2 (m, 4H), 3.9 (m, 4H), 3.6 (bs, 8H). Mass analysis: Electron Spray ToF-MS Pos Ion/90:10 acetonitrile/2 mM ammonium formate pH=8. 15C5-sub-PC $[M+H]^+$=679; MALDI (with DCTB matrix and or HBN matrix): 15C5-sub-PC $[M]^+$=678.

Metals were incorporated into the crown ether by using the following reaction procedure. The 15C5-sub-PC (100 mg) was dissolved in 2 mL EtOH taken in a 50 mL round bottom flask and 1 equivalent of the metal salt (i.e, either NaI, KI, RbI or $PbNO_3$) was added and stirred overnight at room temperature. The solution was later filtered through Whatmann course filter paper to remove any unreacted salts and the filtrate solvent was removed on a rotary evaporator. The product, M/15C5-sub-PC (i.e., Na/15C5-sub-PC, K/15C5-sub-PC, Rb/15C5-sub-PC, or Pb/15C5-sub-PC), was isolated in near quantitative yield. $^1$H NMR of K/15C5-sub-PC ($CDCl_3$) δ: 8.94 (m, 6H), 7.98 (m, 6H), 5.9 (broad s, 1H), 4.95 (broad s, 1H), 4.9 (broad d, 1H), 4.0-3.4 (broad peaks, 16H). Mass analysis: Electron Spray ToF-MS Pos Ion/90:10 acetonitile/2 mM ammonium formate pH=8. K/15C5-sub-PC $[M]^+$=717; RbI/15C5-SubPc $[M]^+$=763. MALDI (with DCTB matrix and or HBN matrix): K/15C5-sub-PC $[M]^+$=717; Rb/15C5-sub-PC $[M]^+$=763.

Synthesis of metallated 18-crown-6 ether subphthalocyanine (M/18C6-sub-PC) derivatives.

For the acylation step, a three neck flask was charged with polyphosphoric acid/acetic acid (2 g/10.49 g), Benzo-18C6 (5 g, 16 mmol), acetic anhydride (8.16 g, 5 equs, 80 mmol). The reaction mixture was stoppered, kept under nitrogen atmosphere, heated at 45° C., and left to stir overnight. The dark brown reaction mixture was washed twice with water (100 mL). The organic products were taken into methylene chloride (100 mL) and dried over $MgSO_4$. The product was chromatographed on $SiO_2$ with EtOAC: Hexane=40:60 ratio eluent. The product, Ac-Benzo-18C6, was isolated as pale white solid (5.2 g). $^1$H NMR ($CDCl_3$) δ: 7.59 (d, 1H), 7.56 (s, 1H), 6.9 (d, 1H), 4.22 (m, 4H), 3.9-4.0 (m, 4H), 3.6-3.8 (m, 12H), 2.6 (s, 3H).

For the oxidation step, a single neck round bottom flask was charged with Ac-Benzo-18C6 (4.7 g, 13.27 mmol), 20 mL $CH_2Cl_2$ and metachloroperbenzoic acid (mCPBA) 1.5 equs (2.5 g, 19.9 mmol). The reaction mixture was stoppered, kept under nitrogen atmosphere, and left to stir overnight. The yellow precipitate reaction mixture was washed with saturated $NaHCO_3$ and then twice with water (100 mL). The organic products were taken into methylene chloride (100 mL) and dried over $MgSO_4$. The product, OAc-Benzo-18C6, was isolated as yellow solid (4.71 g) and used without any further purification. $^1$H NMR ($CDCl_3$) δ: 6.9 (d, 1H), 6.63 (s, 1H), 6.62 (d, 1H), 4.20 (m, 4H), 3.9 (m, 4H), 3.8-3.6 (m, 12H), 2.3 (s, 3H).

For the hydrolysis step, a single neck round bottom flask was charged with OAc-Benzo-18C6 (1.2 g, 3.24 mmol), and hydrolyzed under refluxing conditions with aq. NaOH (10% solution) and the reaction was stirred for 3 hrs under a nitrogen blanket. The reaction mixture was washed with saturated $NaHCO_3$ and then twice with water (50 mL). The organic products were taken into methylene chloride (50 mL), dried over $MgSO_4$. The product, OH-Benzo-18C6, (0.6g) was obtained was used without any further purification.

For condensation reaction, subphthalocyanine chloride and OH-Benzo-18C6 (3.0 g) were added to a single neck round bottom flask in stoichiometric equivalents and dissolved in 10 mL toluene. The flask was fitted to a water cooled condenser and the reaction mixture was placed in a hot oil bath and refluxed conditions for 3 days under a nitrogen blanket. The reaction mixture was cooled, diluted with 20 mL chloroform, washed with 10% NaOH, followed by washing with water. Later, the reaction mixture was suction filtered to remove any unreacted subphthalocyanine chloride, followed by drying the solution using $MgSO_4$ to yield a pink compound, 18C6-sub-PC. The filtrate solution was removed on a rotary evaporater and dried. $^1$H NMR of 18C6-sub-PC (CDCl$_3$) δ: 8.9 (m, 6H), 7.98 (m, 6H), 6.69 (d, 1H), 6.67 (s, 1H), 6.4 (d, 1H), 4.0-3.6 (m, 20H).

Metals were incorporated into the crown ether using the following reaction procedure. The 18C6-sub-PC (30 mg, 3×10$^{-3}$ mmol) was dissolved in 2 mL EtOH taken in a 50 ml, round bottom flask and 1 equivalent of the metal salt (i.e., NaI, KI, RbI or PbNO$_3$) was added and the reaction was stirred overnight at room temperature. The solution was later filtered through Whatmann course filter paper to remove any unreacted salts and the filtrate solvent was removed on a rotary evaporator to give a pink product, M/18C6-sub-PC. $^1$H NMR of Pb/18C6-sub-PC (CDCl$_3$) δ: 8.9 (m, 6H), 7.98 (m, 6H), 6.79 (d, 1H), 6.78 (s, 1H), 6.5 (d, 1H), 4.2-3.8 (m, 20H). Mass analysis: Electron Spray ToF-MS Pos Ion/90:10 acetonitile/2mM ammonium formate pH=8. MALDI (with DCTB matrix and HBN matrix): PbNO$_3$/18C6-sub-PC [M]$^+$=1020.

Additionally, Table 1 indicates certain absorption characteristics of a number of RSA dyes based on UV/Vis absorption analysis in chloroform. More specifically, the $\lambda_{max}$, $\epsilon_{max}$, and $\epsilon_{405nm}$ values for a number of 15C5-sub-PC RSA dyes and a Pb/18C6-sub-PC RSA dye are included.

TABLE 1

| Crown SubPcs | $\lambda_{max}$/nm$^a$ | $\epsilon_{max}$/M$^{-1}$cm$^{-1}$ | $\epsilon_{405nm}$/M$^{-1}$cm$^{-1}$ |
| --- | --- | --- | --- |
| 15C5-sub-PC | 562 | 52390 | 436 |
| K/15C5-sub-PC | 562 | 48986 | 449 |
| Rb/15C5-sub-PC | 564 | 59943 | 407 |
| Pb/18C6-sub-PC | 566 | 48009 | 331 |

In the production of an optical medium, it is also generally desirable to utilize reactant species having relatively high quantum efficiencies. That is, it is generally desirable to utilize reactant species in which a greater number of reactant molecules react at low recording light intensity. This high quantum efficiency of the reactant enables efficient chemical modification of the optical medium, resulting in the modulation of the index of refraction of the medium using lower intensity light (e.g., fewer total photons). Accordingly, less energy may be consumed during the recording process, a greater number of reactant molecules may be converted during a write operation, and/or recording times may be reduced.

For example, U.S. patent application Ser. No. 12/550,521, entitled, "OPTICAL DATA STORAGE MEDIA AND METHODS FOR USING THE SAME", which is incorporated by reference herein in its entirety for all purposes, discloses examples of cinnamate analogues that have been used as reactant species in holographic media. For the cinnamate analogues, one or more cinnamate units may be bound to a polymer backbone (e.g., polyvinyl alcohol) to produce a polymer structure (e.g., polyvinylcinnamate). Accordingly, when nearby cinnamate units of a polyvinylcinnamate encounter an excited RSA$^{3*}$ species, an indirect photodimerization reaction may occur as indicated below:

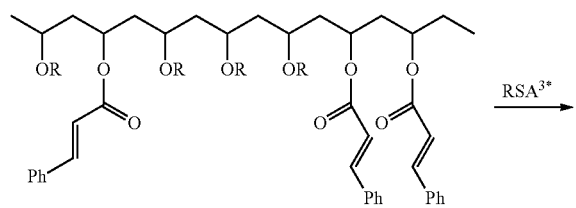

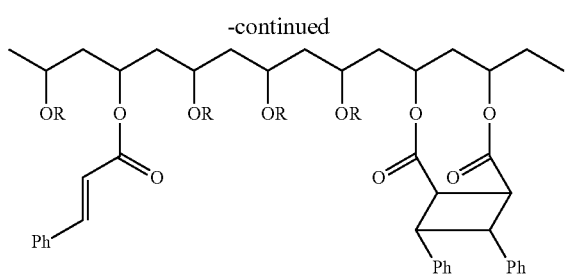

Similarly, present embodiments utilize a DPCP-derivative reactant species capable of undergoing an indirect photodimerization reaction that results in a change in the index of refraction of the optical medium. More specifically, the DPCP-derivatives are capable of undergoing a [2+2] dimerization reaction, similar to the cinnamate analogs, upon being sensitized to an excited triplet state by an excited RSA sensitizer (i.e., RSA$^{3*}$), resulting in a localized refractive index change in the optical medium. For example, in certain embodiments, one or more DPCP units may be bound to a polymer backbone (e.g., polyvinyl alcohol) to produce a polymer structure (e.g., polyvinyl-DPCP). Accordingly, when nearby DPCP units of a polyvinyl-DPCP encounter an excited RSA$^{3*}$ species, an indirect photodimerization reaction may occur as indicated below:

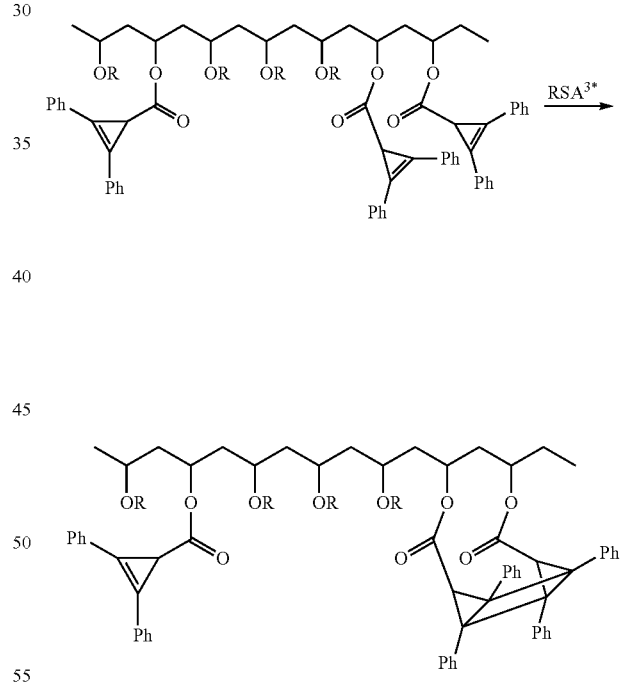

As such, once a substantial number of photodimerization events between reactant units have occurred, a localized change in the index of refraction of the holographic medium may be observed. It should be noted that, in certain embodiments, an optical medium may include any combination of DPCP-derivative, cinnamate-derivative, and stilbene-derivatives disposed within and/or bound to the polymer matrix.

Accordingly, present embodiments utilize a diphenyl cyclopropene (DPCP)-derivative reactant species according to the general formula shown below:

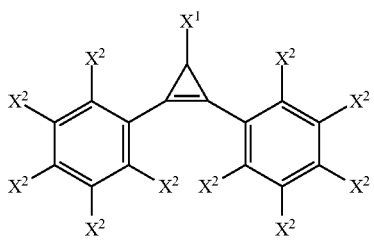

where $X^1$ may be a proton, a carbonyl, a carboxylic acid, a carboxylate, or a linkage (e.g., an ester, amide, or ether linkage) to a polymer backbone; and where each $X^2$ may independently be either a proton, a halide (e.g., bromide, fluoride, chloride, iodide, etc.), a hydrocarbyl group (e.g., methyl, ethyl, t-butyl, etc.) having between 1 and 10 carbons, an alkoxy group (e.g., methoxy, ethoxy, iso-propoxy, etc.) having between 1 and 10 carbons, a nitro group, or an amine group. In certain embodiments, two or more $X^2$ groups may represent multiple points of attachment of a larger arene structure having between 1 and 20 carbons. Examples of suitable DPCP-derivative structures include, but are not limited to: 2,3-diphenylcycloprop-2-enone; 2,3-diphenylcycloprop-2-enecarboxylate; 2,3-bis(perchlorophenyl)cycloprop-2-enecarboxylate; 2,3-di(naphthalen-2-yl)cycloprop-2-enecarboxylate; 2,3-bis(4-methoxyphenyl)cycloprop-2-enecarboxylate; 2,3-bis(4-iodophenyl)cycloprop-2-enecarboxylate; 2,3-bis(4-(tert-butyl)phenyl)cycloprop-2-enecarboxylate; or 2-(4-aminophenyl)-3-(4-nitrophenyl) cycloprop-2-enecarboxylate. Any of these, as well as any other DPCP-derivative structures affording the aforementioned indirect photodimerization behavior, may be utilized.

As mentioned, the DPCP-derivative reactant units may be coupled to a polymer backbone via a ether, ester, or amide linkage. For example, a polyvinyl-DPCP chain may be synthesized by forming an ester linkage between a 2,3-diphenyl-cycloprop-2-enecarboxylic acid and poly(vinyl alcohol) according to the reaction:

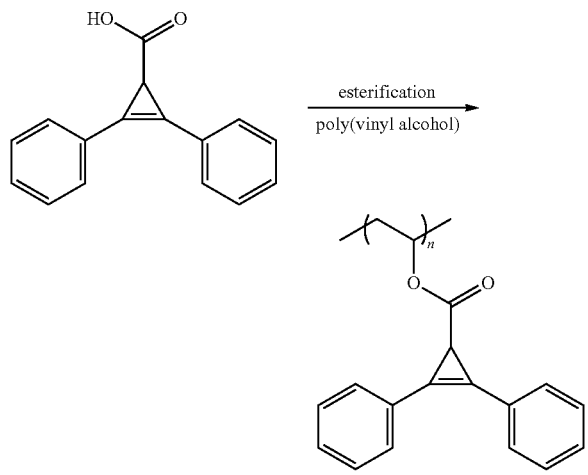

Figure 4:
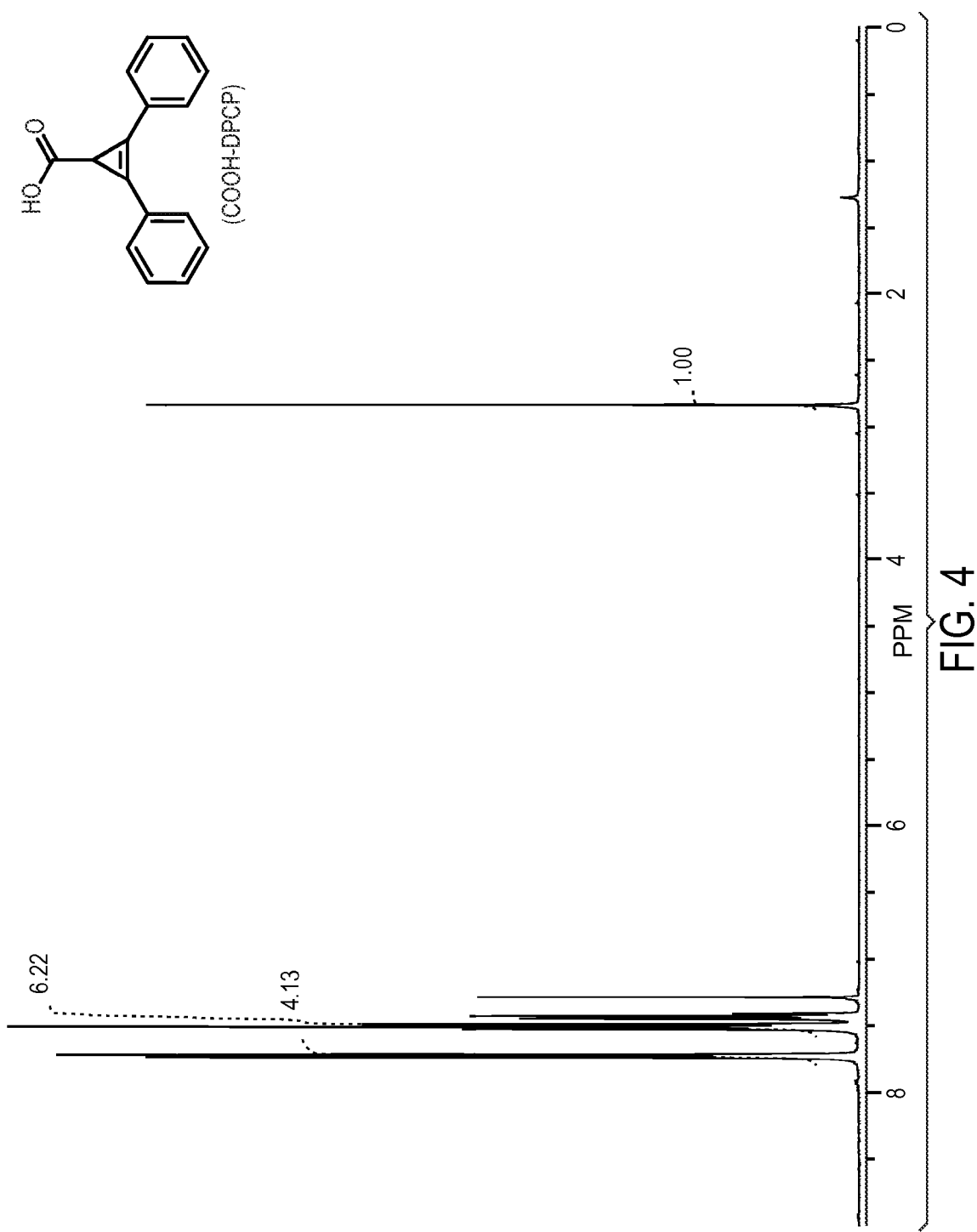
FIG. 4 is a proton nuclear magnetic resonance (NMR) spectra for 2,3-diphenylcycloprop-2-enecarboxylic acid (COOH-DPCP), in accordance with aspects of the present disclosure.
Figure 5:
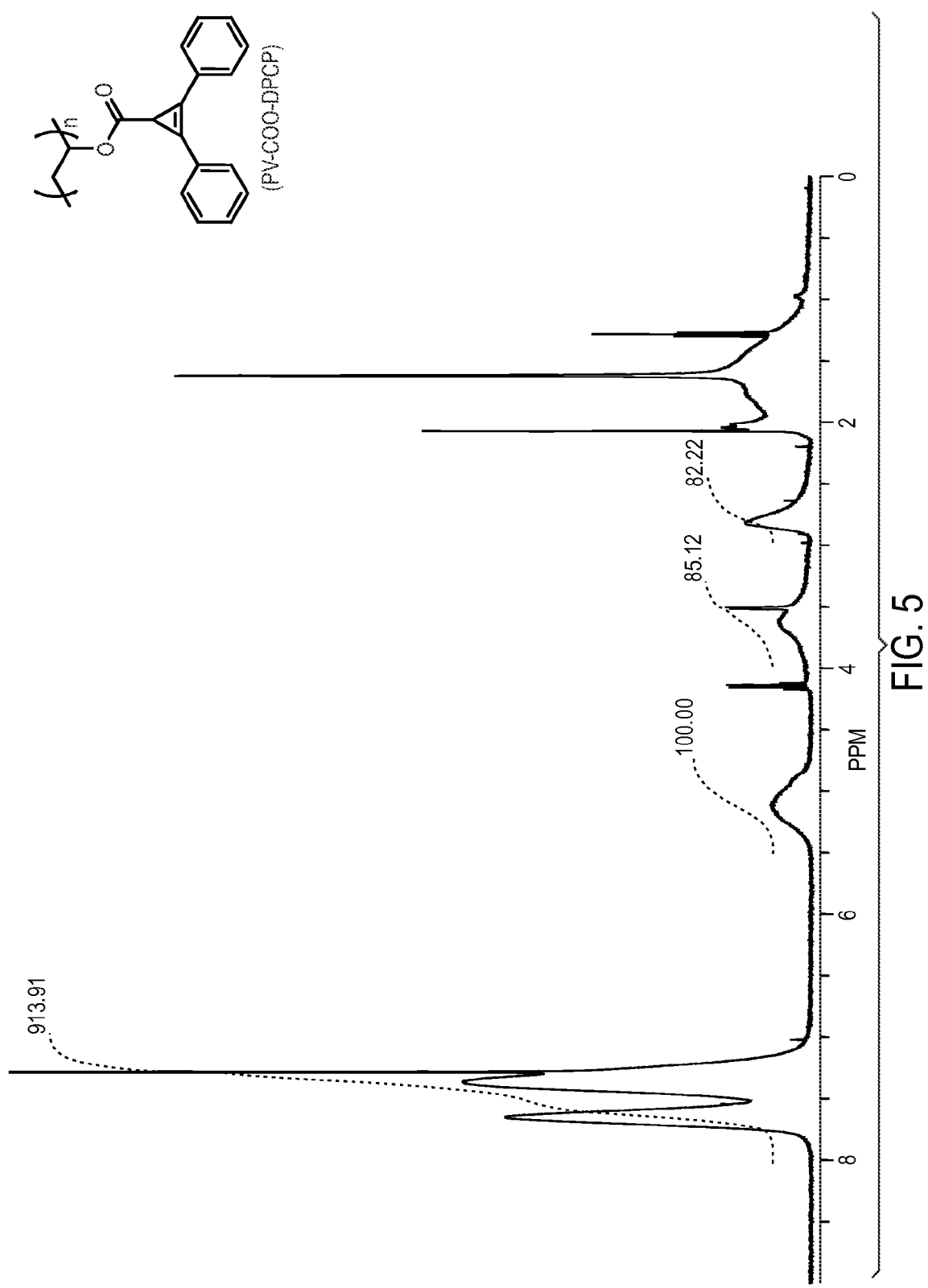
FIG. 5 is a proton nuclear magnetic resonance (NMR) spectra for polyvinyl-(2,3-diphenylcycloprop-2-enecarboxylate) (PV-COO-DPCP), in accordance with aspects of the present disclosure.
Figure 6:
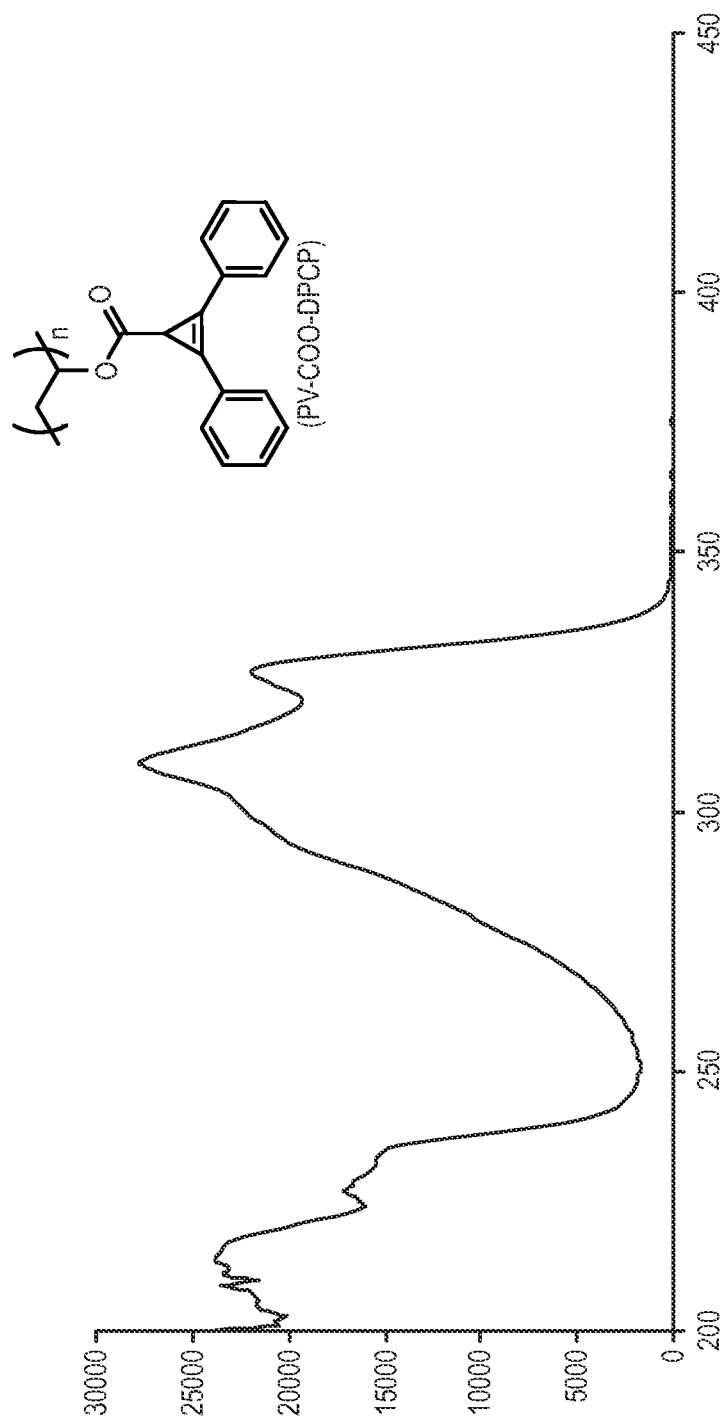
FIG. 6 is a ultra-violet/visible (UV/Vis) absorption spectra for polyvinyl-(2,3-diphenylcycloprop-2-enecarboxylate) (PV-COO-DPCP), in accordance with aspects of the present disclosure.

That is, the carboxylic acid of the DPCP-derivative may be coupled to the poly(vinyl alcohol) backbone using any esterification reaction (e.g., Fischer esterification, Steglich esterification, Mitsunobu esterification, etc.). For example, in certain embodiments, the esterification reaction may proceed by first synthesizing the acid chloride of the DPCP-carboxylic acid (e.g., using oxalyl chloride, thionyl chloride, phosphorus trichloride, or phosphorus pentachloride), and then condensing the resulting DPCP-acid chloride with poly(vinyl)alcohol. By further example, in certain embodiments, a carbodiimide species (e.g., dicyclohexylcarbodiimide (DCC), di-isopropylcarbodiimide (DIPC), etc.) may be used to activate the DPCP-carboxylic acid for nucleophilic attack by the alcohol groups of poly(vinyl alcohol). Proton nuclear magnetic resonance (NMR) spectra for both 2,3-diphenylcycloprop-2-enecarboxylic acid (COOH-DPCP) and polyvinyl-(2,3-diphenylcycloprop-2-enecarboxylate) (PV-COO-DPCP) are illustrated in FIGS. 4 and 5. Furthermore, FIG. 6 illustrates the UV/Visible absorption spectrum for the PV-COO-DPCP polymer.

Furthermore, depending on the relative concentration of the DPCP-derivative and the poly(vinyl alcohol), different DPCP-derivative loadings may be achieved. For example, in certain embodiments, 60% or more of the alcohol groups in the poly(vinyl alcohol) polymer may be coupled to a DPCP-derivative unit. It should be noted that while a polymer chain functionalized with the DPCP-derivative units alone is presented, in certain embodiments, the DPCP-derivative units may be interspersed between other unsaturated reactant species (e.g., cinnamate derivatives, stilbene derivatives, etc.) along the polymer chain (e.g., poly(vinyl alcohol)). In still other embodiments, polymer chains (e.g., poly(vinyl alcohol) chains) may be separately decorated with different reactant species (e.g., DPCP-derivatives, cinnamate derivatives, stilbene derivatives, etc.) and the different polymer chains may be combined during the production of the optical medium.

As discussed in detail below, the DPCP-derivative structure affords improved sensitivity over other reactant species, such the cinnamate derivates. That is, the presently disclosed DPCP-derivative embodiments afford higher quantum efficiencies than the previously disclosed cinnamate derivatives, even when using recording light of lower intensity. While not wishing to be limited to any particular mechanism, generally speaking, it is believed that the DPCP-derivative has a triplet excited state (e.g., $T_1$ 34) having a longer lifetime (e.g., on the order of a few hundred microseconds) than the cinnamate derivatives (e.g., on the order of tens of nanoseconds). Accordingly, this longer lifetime may allow the DPCP-derivative species significantly more time to react with another DPCP-derivative unit before the excited state decays by a different path, and this results in better efficiency in the quantum yield of reaction. This improved sensitivity generally enables the recording of holograms using recording light of lower intensities as well as faster recording of the hologram.

One way of measuring the sensitivity of a particular reactant species is to determine the change in the refractive index of an optical medium utilizing the reactant species as a function of the intensity of actinic light used to record data to the optical medium. Refractive index measurements may be performed using an ellipsometer to measure bulk materials (e.g., using spin coated samples). Thus, the reactive materials used in these applications may be tested to determine the net change in the refractive index, Δn, of the material by measuring the refractive index, n, of the sample before and after exposure to actinic radiation of varying intensity (constant fluence).

Figure 7:
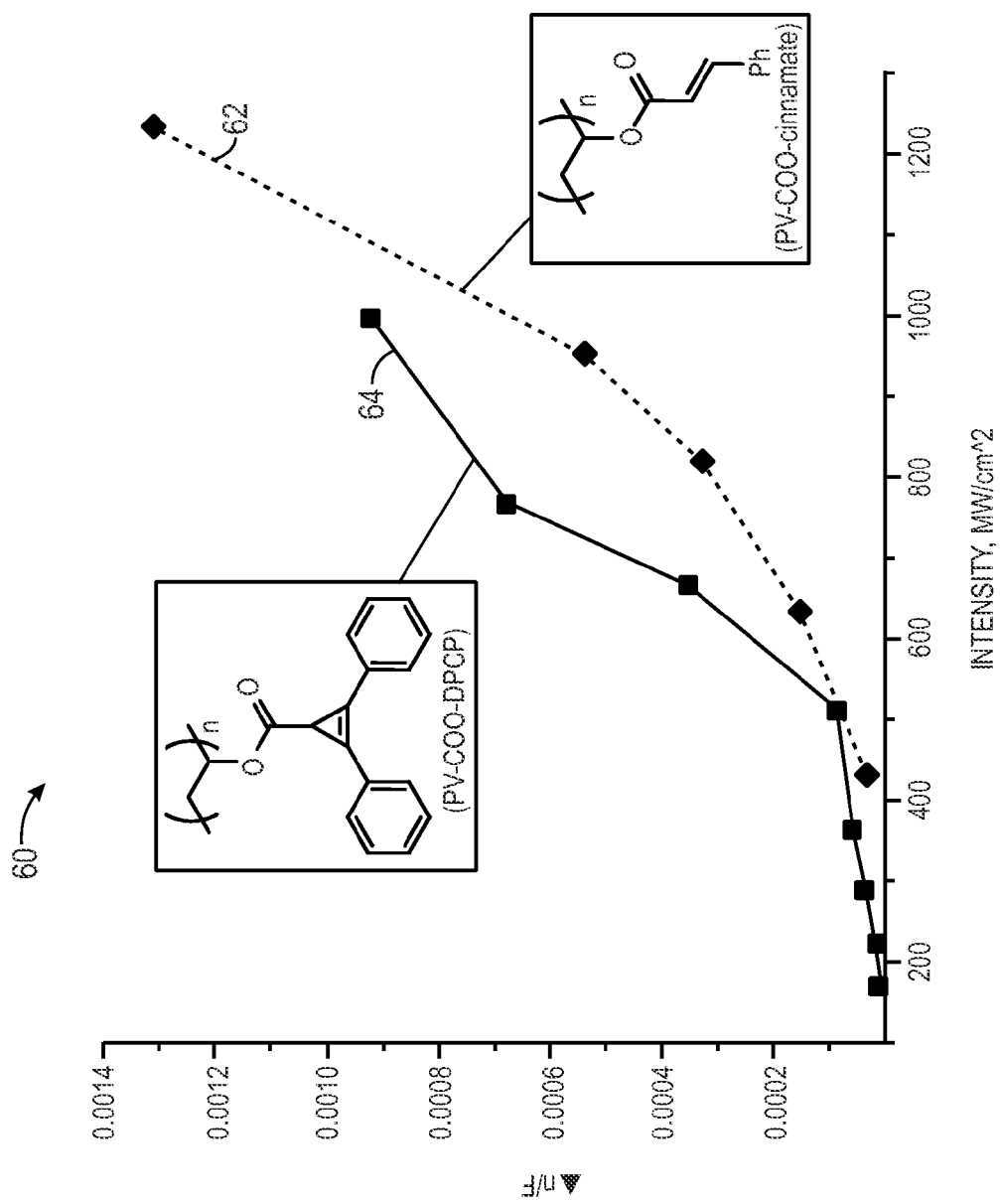
FIG. 7 is a graph illustrating the change in the refractive index of two different optical media being exposed to recording light of varying intensity, in accordance with aspects of the present disclosure.

For example, FIG. 7 is a graph 60 illustrating the change in the refractive index of different optical media being exposed to actinic radiation (e.g., around 405 nm) of varying intensity (constant fluence). More specifically, FIG. 7 illustrates curves for two different optical media, as described above, each utilizing a different reactant species. As illustrated, curve 62 corresponds to the Δn of an irradiated optical medium utilizing the illustrated cinnamate-derivative (PV-COO-cinnamate) as the reactant species. In contrast, curve 64 corresponds to the Δn of an irradiated optical medium utilizing the illustrated DPCP-derivative (PV-COO-DPCP) as the reactant species.

Generally speaking, the sensitivity of each optical medium may be assessed by considering how much the refractive index of each optical medium changes when irradiated using actinic light. As such, the two curves of FIG. 7 (e.g., 62 and 64) may be compared to assess the relative sensitivity of the corresponding reactant species. For curve 62, representing the cinnamate-derivative, PV-COO-cinnamate, a Δn of approximately $3.0 \times 10^{-4}$ is observed when using recording light of approximately 800 MW/cm$^2$. In contrast, curve 64, corresponding to the DPCP-derivative, PV-COO-DPCP, illustrates a Δn of approximately $7.0 \times 10^{-4}$ when using recording light of approximately the same intensity. Accordingly, a substantial improvement in sensitivity is observed for the holographic media utilizing DPCP-derivative reactant species compared to the medium utilizing the cinnamate-derivative reactant species. More specifically, an approximately two-fold to three-fold increase in the Δn of holographic media utilizing the DPCP-derivative reactant species is observed when the media is exposed to recording light.

Furthermore, the quantum efficiency for each of the optical media illustrated in FIG. 7 may also be determined. More specifically, these quantum efficiencies (which are discussed in detail below with respect to FIG. 8) may be determined using a quantum efficiency measurement setup, such as the one illustrated in FIG. 9. That is, FIG. 9 illustrates a schematic of an embodiment of a quantum efficiency measurement setup 80 for performing the quantum efficiency measurement. In the illustrated setup 80, a pump beam 82 (e.g., from a laser source 83 capable of producing light having a wavelength of approximately 405 nm) and UV probe beam 84 (e.g., from a UV lamp 85 capable of producing wavelengths of approximately 280 nm to 360 nm) are incident on a sample 86 in a counter-propagating geometry. The beams 82 and 84 may be focused on a surface of the sample 86 by a number of respective objectives and/or lenses 88 (e.g., microscope UV objectives and UV quartz lenses with UV anti-reflecting coatings). Additionally, the spot 90 of the focused pump beam 82 (which may be approximately 20 um in diameter at the surface of the sample 86) and the spot 92 of the focused UV probe beam 84 may be configured to overlap at the surface of the sample 86. Furthermore, after the UV probe beam 84 has traversed the sample 86, UV probe beam 84 passes a dichromic mirror 94 and is subsequently focused by a number of objectives and/or lenses 88 (e.g., a UV objective) onto the approximately 20 um pinhole entrance 96 to a UV/Vis spectrometer 98. The collecting optics may be configured to have magnification close to 1 and, therefore, the spot 90 may be imaged using a detector pinhole of the approximately the same size (e.g., approximately 20 um), resulting in a confocal detection configuration. As such, the diameter of the spot 92 of the focused UV probe beam 84 may be larger than the spot 90 of the focused pump beam 82; however, the confocal geometry of the illustrated setup 80 may limit the probing region to approximately 20 um.

Figure 10:
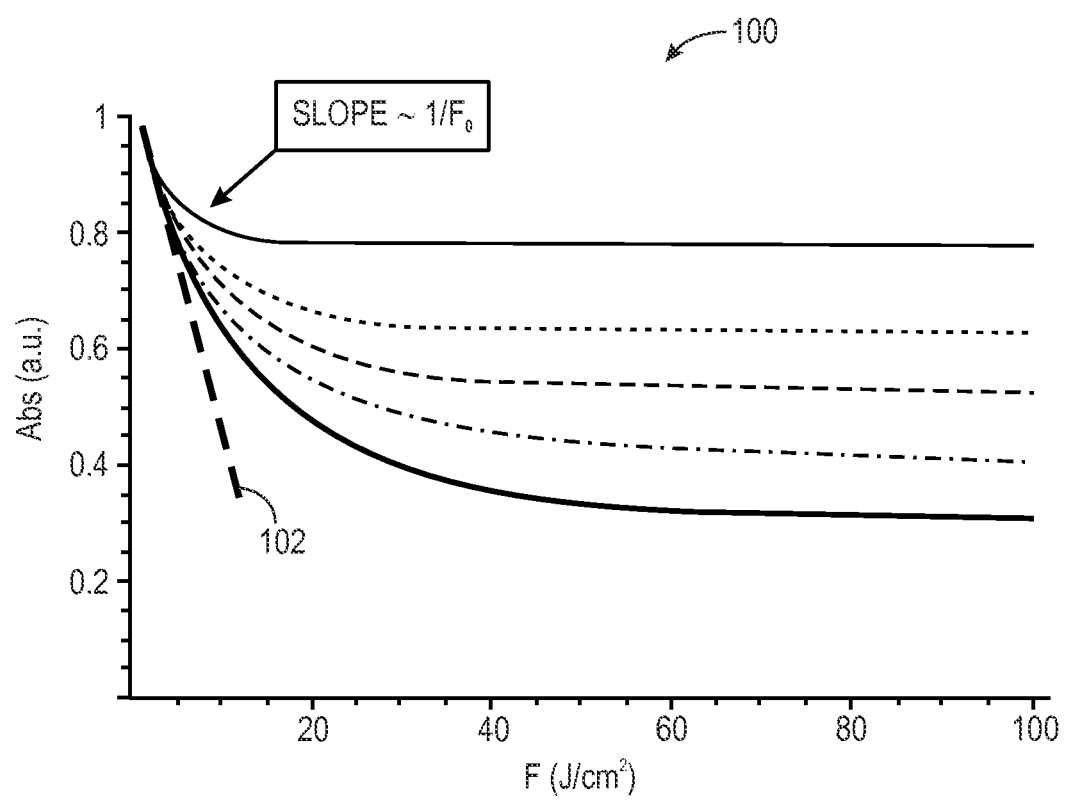
FIG. 10 is an embodiment of a graph illustrating an absorbance versus fluence plot.

The illustrated setup 80 enables measuring the change in the absorbance of the index change material (e.g., the sample 86) as a function of the fluence of the pump beam 82 using the UV probe beam 84. $F_0$, which may be considered the fluence number where the absorbance is zero, may be approximated using an absorbance versus fluence plot 100, illustrated in FIG. 10, using data obtained via the setup 80. In the illustrated plot 100, the slope of the illustrated line 102 approximately equals $1/F_0$. Using this derived $F_0$, the quantum efficiency, Q(I), of the energy transfer process may be calculated using the following equation:

$$Q(I) = \frac{hv}{F_0(I)\sigma_{RSA}(I)}, \quad \text{Eq. 1}$$

wherein $\sigma_{RSA}(I)$ is the RSA excited absorption cross section. For example, the quantum efficiency could be measured at different intensities to verify the threshold behavior of the sample 86.

Figure 8:
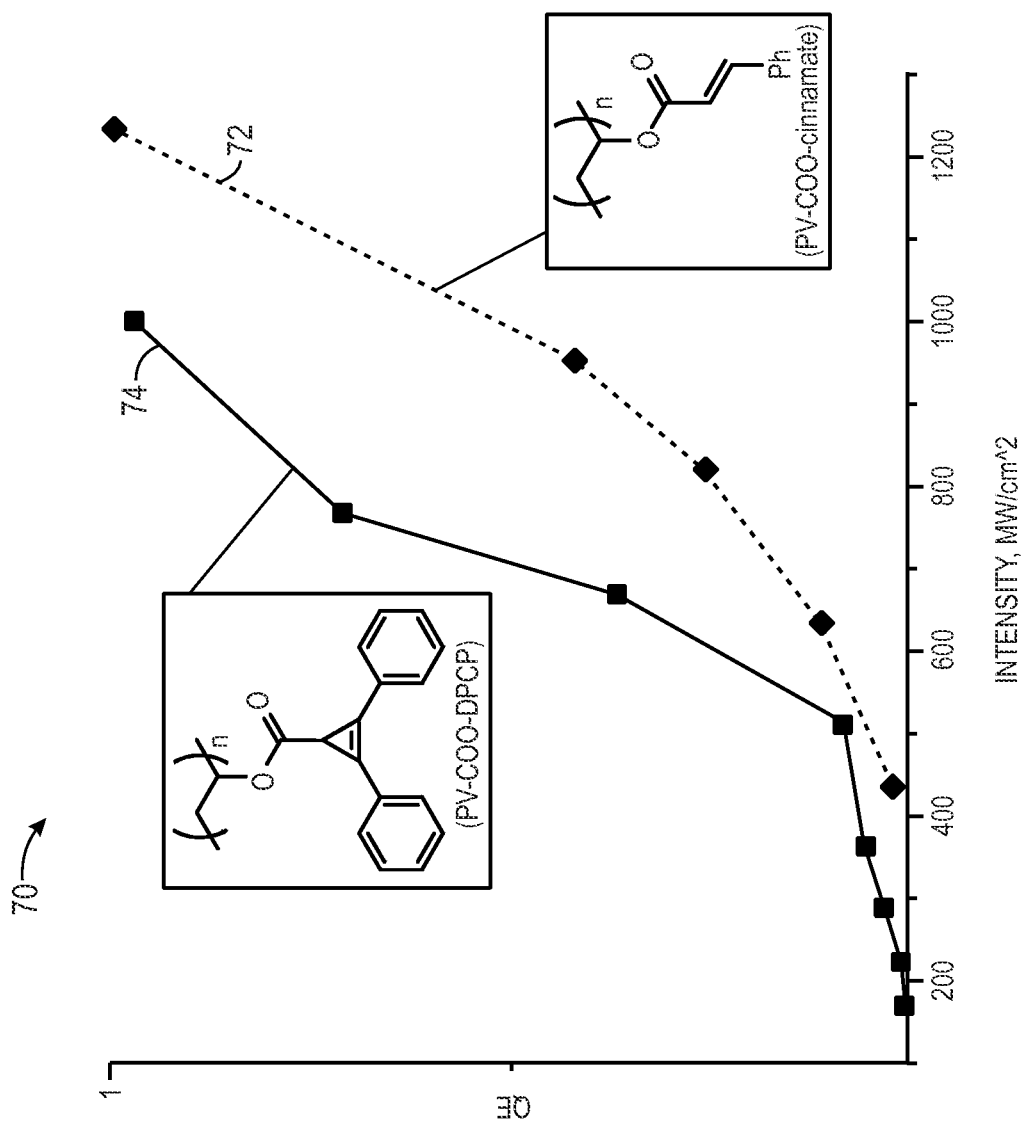
FIG. 8 is a graph illustrating the quantum efficiency of two different optical media being exposed to recording light of varying intensity, in accordance with aspects of the present disclosure.
Figure 9:
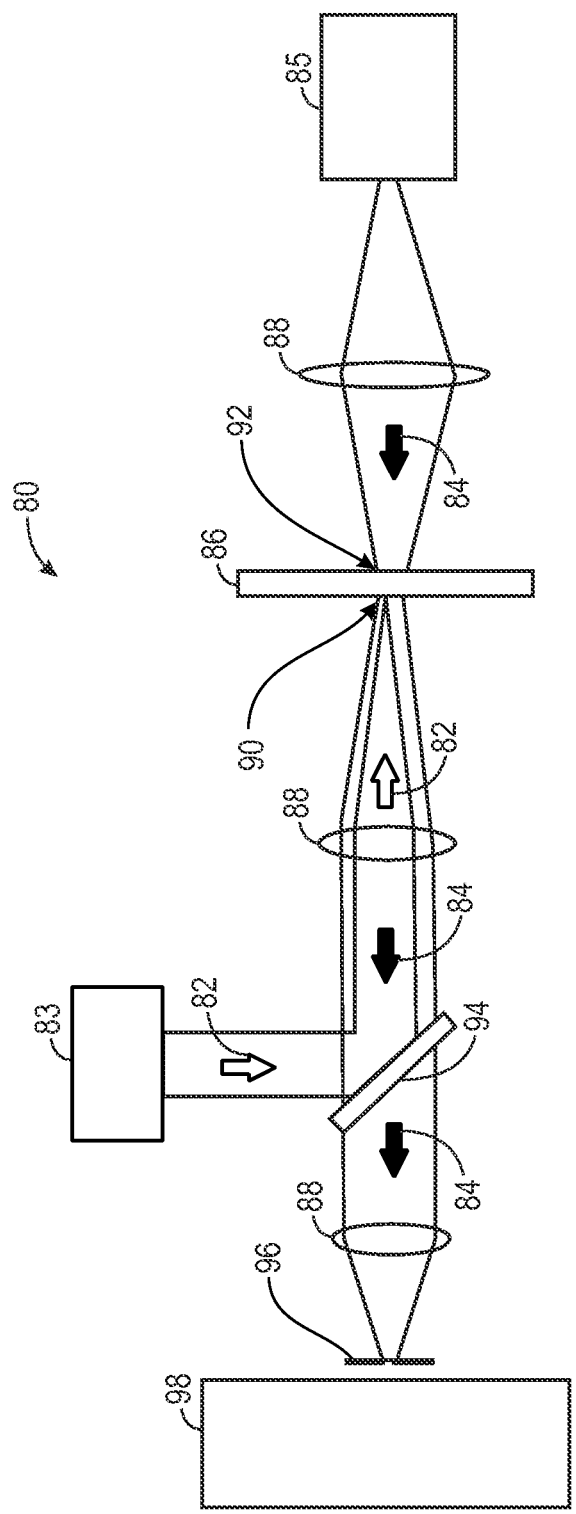
FIG. 9 is a schematic illustrating an embodiment of a quantum efficiency measurement setup for performing the quantum efficiency measurement.

FIG. 8 is a graph 70 illustrating two curves (e.g., 72 and 74) corresponding to the quantum efficiencies of the same two optical media described above, with respect to FIG. 7, which were measured using the setup described above, with respect to FIG. 9. As such, for curve 72 (corresponding the cinnamate-derivative, PV-COO-cinnamate), a quantum efficiency of approximately 25% at an intensity of approximately 800 MW/cm$^2$ is observed. In contrast, for curve 74 (corresponding to the DPCP-derivative, PV-COO-DPCP), a quantum efficiency of approximately 70% is observed at approximately the same intensity. Accordingly, the improvement in the quantum efficiency when recording with an optical medium utilizing a DPCP-derivative reactant species may range from approximately two-fold to more than three-fold.

Technical effects of the invention include the manufacture of holographic media having greater sensitivity and quantum efficiency than previously achieved. As described above, the disclosed DPCP-derivative reactant species provide relatively high quantum efficiencies compared to other reactants (e.g., cinnamate derivatives). These improved sensitivities enable the writing of microholograms in the nanosecond time scale using relatively low-intensity light around 405 nm, allowing many more layers of data to be written compared to other wavelengths (e.g., 532 nm). This enables the development of hologram-based, high-density data storage systems and devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical storage medium comprising:
   a polymer matrix comprising one or more polymer chains;
   a reverse saturable absorption (RSA) sensitizer disposed within the polymer matrix and configured to become excited upon exposure to light having an intensity above an intensity threshold and configured to transfer energy to a reactant, wherein the RSA sensitizer is a metal-subphthalocyanine (M-sub-PC) RSA dye comprising a subphthalocyanine portion, a linker portion, a metal binding portion, and a metal portion; and
   a diphenyl cyclopropene (DPCP)-derivative reactant disposed within the polymer matrix and configured to undergo a modification upon receiving an energy transfer from the excited sensitizer to provide a change in a refractive index of the optical medium.

2. The optical storage medium of claim 1, wherein the DPCP-derivative reactant is bound to the one or more polymer chains.

3. The optical storage medium of claim 2, wherein greater than approximately 60% of a plurality of binding sites of the one or more polymer chains are coupled to the DPCP-derivative reactant species.

4. The optical storage medium of claim 1, wherein the polymer matrix comprises one or more of: poly(vinyl alcohol), poly(alkyl methacrylate), poly(alkyl acrylate), polystyrene, polycarbonate, poly acrylate, poly(vinylidene chloride), or poly(vinyl acetate) polymer chains.

5. The optical storage medium of claim 1, comprising a stilbene-derivative reactant, a cinnamate-derivative reactant, or both, disposed in the polymer matrix.

6. The optical storage medium of claim 1, wherein the change in the refractive index of the optical medium produces microholograms capable of storing data.

7. The optical storage medium of claim 1, wherein the change in the refractive index of the optical medium is greater than approximately 0.08.

8. The optical storage medium of claim 1, wherein the modification has a quantum efficiency of approximately 70% at 800 MW/cm$^2$.

9. The optical storage medium of claim 1, wherein the modification has a quantum efficiency of approximately 60% at 800 MW/cm$^2$.

10. A refractive-index change composition comprising:
a metal-subphthalocyanine (M-sub-PC) reverse saturable absorption (RSA) sensitizer comprising a subphthalocyanine portion, a linker portion, a metal binding portion, and a metal portion; and
a diphenyl cyclopropene (DPCP)-derivative reactant species having the general formula:

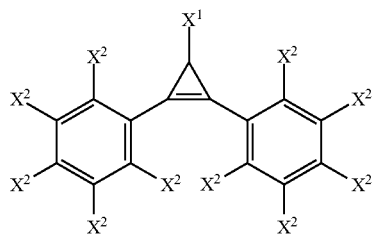

wherein,
$X^1$ comprises a proton, a carbonyl, a carboxylic acid, a carboxylate, or an ether, ester, or amide linkage to a polymer chain; and wherein each $X^2$ independently comprises a proton, a halide, a hydrocarbyl group having between 1 and 10 carbons, an alkoxy group having between 1 and 10 carbons, a nitro group, an amine group, or portions of a larger arene structure having between 1 and 20 carbons.

11. The composition of claim 10, wherein the DPCP-derivative reactant species comprises: 2,3-diphenylcycloprop-2-enone; 2,3-diphenylcycloprop-2-enecarboxylate; 2,3-bis(perchlorophenyl)cycloprop-2-enecarboxylate; 2,3-di(naphthalen-2-yl)cycloprop-2-enecarboxylate; 2,3-bis(4-methoxyphenyl)cycloprop-2-enecarboxylate; 2,3-bis(4-iodophenyl)cycloprop-2-enecarboxylate; 2,3-bis(4-(tert-butyl)phenyl)cycloprop-2-enecarboxylate; 2-(4-aminophenyl)-3-(4-nitrophenyl)cycloprop-2-enecarboxylate; or any combination thereof.

12. The composition of claim 10, wherein the polymer chain comprises one or more of a poly(vinyl alcohol), poly(alkyl methacrylate), poly(alkyl acrylate), polystyrene, poly-carbonate, poly acrylate, poly(vinylidene chloride), or poly(vinyl acetate) polymer chains.

13. The composition of claim 10, wherein the DPCP-derivative is bound to a polymer according to the general formula:

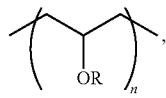

wherein R is a proton or the DPCP-derivative species, and wherein n is an integer between 1 and 10,000, and wherein greater than approximately 65% of R in the polymer is the DPCP-derivative species.

14. The composition of claim 10, wherein the DPCP-derivative reactant species comprises between approximately 10% and 85% of a total weight of the composition.

15. The composition of claim 10, wherein the reactant species is configured to undergo indirect photochemical reactions that modify the refractive index of the composition upon receiving an energy transfer from the RSA sensitizer.

16. The composition of claim 10, wherein the composition is capable of recording microholograms when exposed to recording light having an intensity greater than an intensity threshold, wherein the microholograms comprise one or more localized changes in the refractive index of the composition that record information regarding the phase and intensity of the recording light.

17. A method for storing data on an optical medium comprising:
irradiating a portion of the optical medium with recording light having an intensity above an intensity threshold, wherein the optical medium comprises a reverse saturable absorber (RSA) and a diphenyl cyclopropene (DPCP)-derivative reactant disposed within a polymer matrix, and wherein the RSA is a metal-subphthalocyanine (M-sub-PC) RSA comprising a subphthalocyanine portion, a linker portion, a metal binding portion, and a metal portion;
exciting the RSA to an excited triplet state with the recording light such that the excited RSA sensitizes a chemical modification of the reactant; and
modifying the DPCP-derivative reactant such that the refractive index of the portion of the optical medium is altered to form a hologram in the optical medium.

18. The method of claim 17, wherein the hologram stores information about the intensity and phase of the recording light.

19. The method of claim 18, comprising interrogating the portion of the optical medium using lower intensity light than the recording light such that the information stored in the hologram can be non-destructively recovered.

20. The method of claim 18, wherein irradiating a portion of the optical medium comprises irradiating a portion of the optical medium with recording light having a wavelength of approximately 405 nm.

21. The method of claim 18, wherein irradiating a portion of the optical medium comprises irradiating a portion of the optical medium with recording light having a wavelength between approximately 370 nm and 650 nm.

22. The method of claim 17, wherein a quantum efficiency of the modification is greater than approximately 60% at 800 MW/cm$^2$.

* * * * *